(12) United States Patent
Kanno et al.

(10) Patent No.: US 11,972,110 B2
(45) Date of Patent: Apr. 30, 2024

(54) STORAGE DEVICE AND STORAGE SYSTEM

(71) Applicant: Kioxia Corporation, Tokyo (JP)

(72) Inventors: Shinichi Kanno, Ota (JP); Kensaku Yamaguchi, Kawasaki (JP); Takehiko Kurashige, Ome (JP); Yuki Sasaki, Kamakura (JP)

(73) Assignee: Kioxia Corporation, Tokyo (JP)

(*) Notice: Subject to any disclaimer, the term of this patent is extended or adjusted under 35 U.S.C. 154(b) by 58 days.

(21) Appl. No.: 17/931,363

(22) Filed: Sep. 12, 2022

(65) Prior Publication Data

US 2023/0236730 A1 Jul. 27, 2023

(30) Foreign Application Priority Data

Jan. 24, 2022 (JP) .................... 2022-008613

(51) Int. Cl.
 *G06F 3/06* (2006.01)
(52) U.S. Cl.
 CPC .......... *G06F 3/0613* (2013.01); *G06F 3/0659* (2013.01); *G06F 3/0679* (2013.01)
(58) Field of Classification Search
 None
 See application file for complete search history.

(56) References Cited

U.S. PATENT DOCUMENTS

| 5,412,803 A | * | 5/1995 | Bartow | G06F 13/122 |
| | | | | 709/213 |
| 10,705,974 B2 | | 7/2020 | Qiu et al. | |
| 2016/0342545 A1 | * | 11/2016 | Arai | G06F 11/0727 |
| 2018/0335975 A1 | | 11/2018 | Cosby et al. | |
| 2020/0050402 A1 | | 2/2020 | Furey et al. | |

* cited by examiner

*Primary Examiner* — Kevin Verbrugge
(74) *Attorney, Agent, or Firm* — Oblon, McClelland, Maier & Neustadt, L.L.P.

(57) ABSTRACT

According to one embodiment, in response to receiving, from a host, one or more second type commands, a controller of the storage device maintains the received one or more second type commands in a memory region in the storage device without completing processing of the received one or more second type commands. In response to receiving the first type command from the host, the controller completes processing of a second type command, and transmits a command completion response for the first type command to the host as a first preceding response for the first type command. In response to completion of processing of the first type command, the controller transmits a command completion response for the first type command to the host.

19 Claims, 22 Drawing Sheets

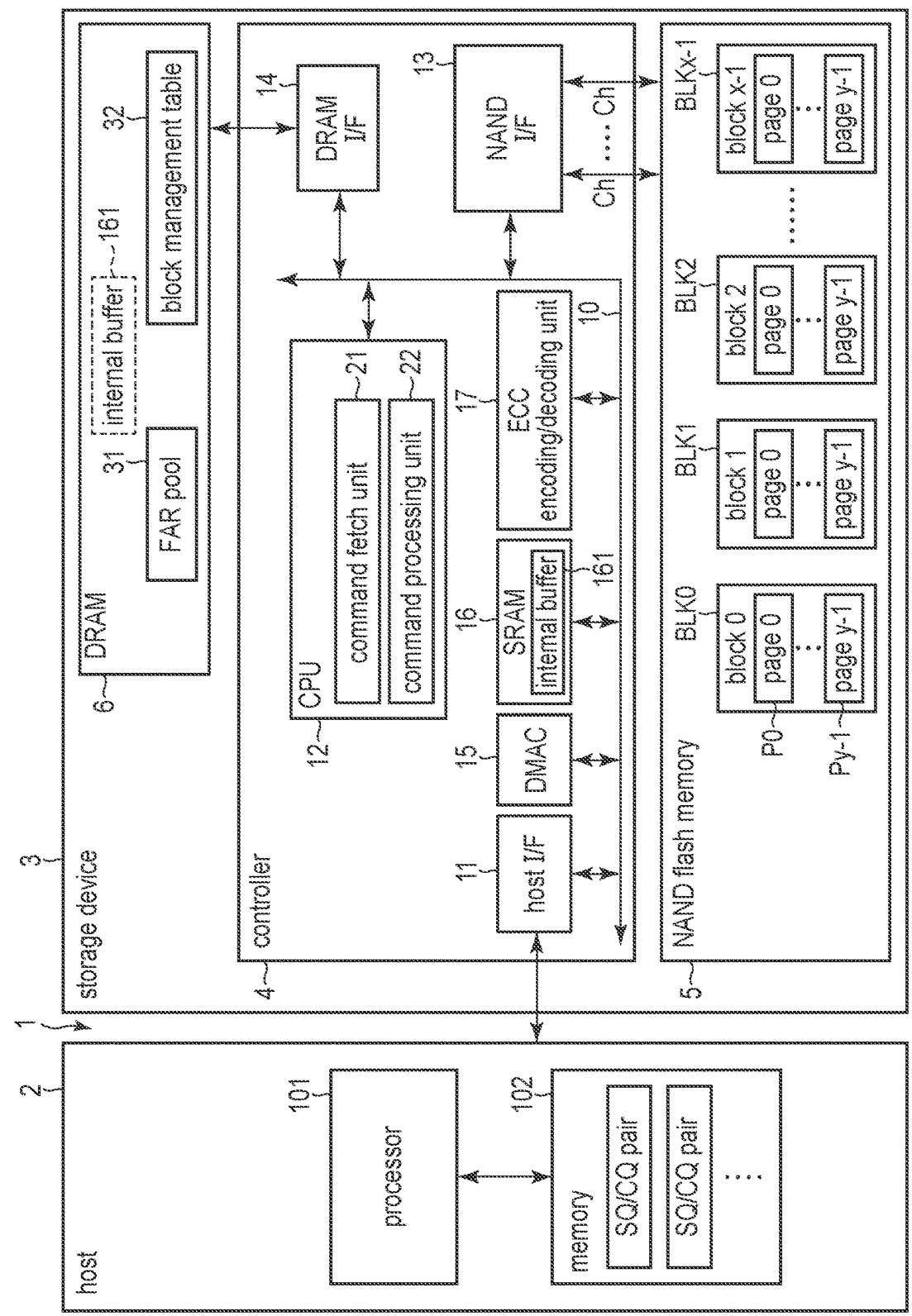
F I G. 3

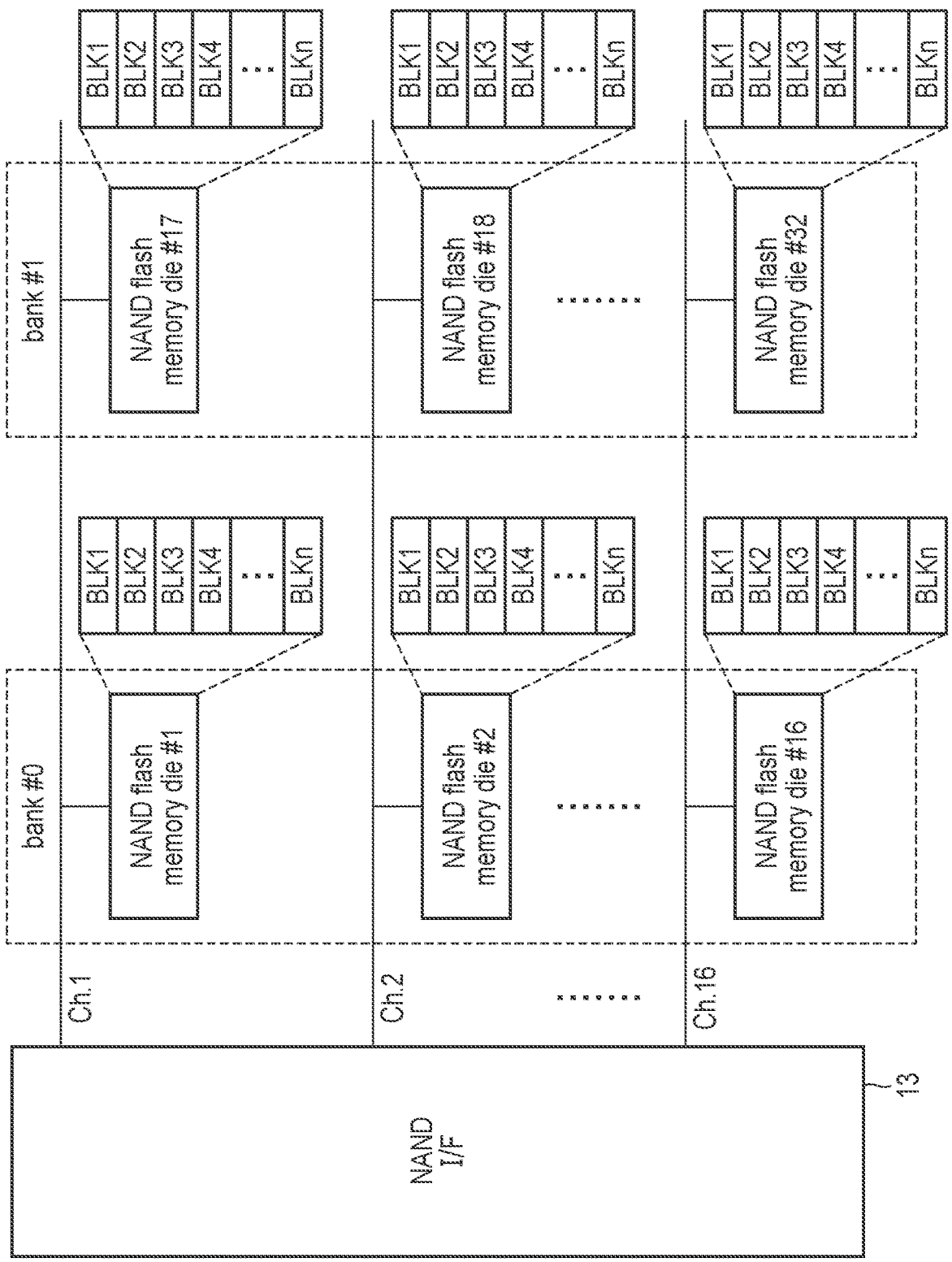
F I G. 4

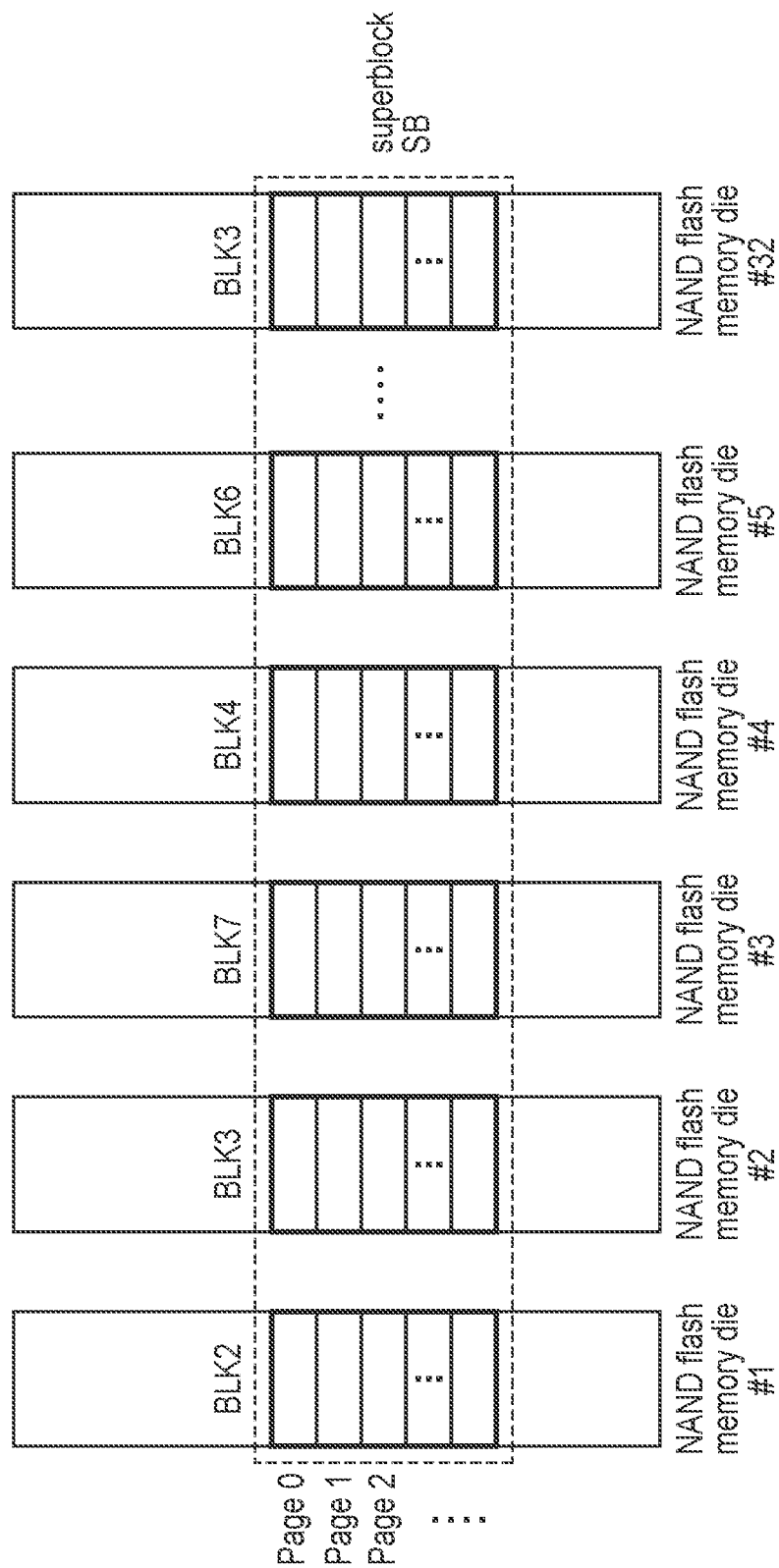
F I G. 5

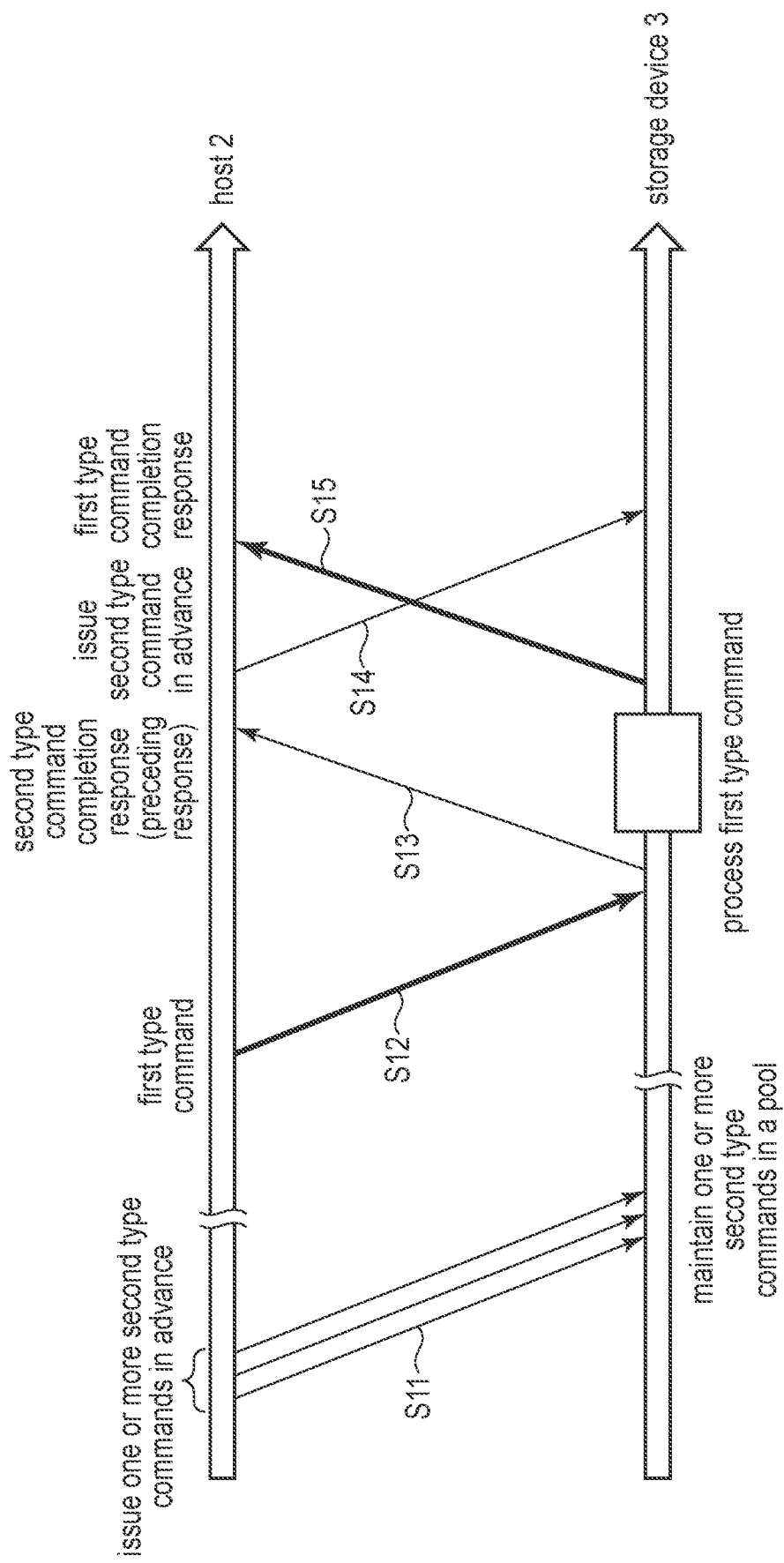
F I G. 6 nameless write command (NLW)

|  | description |
|---|---|
| command ID | command ID of write command |
| QoS domain ID | identifier of QoS domain to which data is to be written |
| placement ID | identifier of storage region in QoS domain to which data is to be written |
| user address tag (UA tag) | identifier of data to be written (for example: LBA, key of key value store, or hash value of the key) |
| process ID | identifier of process requesting to write data |
| length | length of data to be written |
| data pointer | buffer address indicating a location in memory of host where data to be written is stored |

F I G. 8 flash address read command (FAR)

|  | description |
|---|---|
| command ID | command ID of FAR |
| QoS domain ID | identifier of QoS domain associated with FAR |
| placement ID | identifier of storage region in QoS domain associated with FAR |
| process ID | identifier of process associated with FAR |
| data pointer | buffer address indicating a location in memory of host to which information associated with preceding response is to be transferred |
| size | size of read buffer |

F I G. 9 preceding response (address recording request: ARR)

| | description |
|---|---|
| user address tag (UA tag) | UA tag included in corresponding write command |
| physical address | write destination location to which data associated with corresponding write command is to be written (physical address is represented by identifier of superblock and offset) |
| identification information | identification information for identifying corresponding write command (for example: QoS domain ID, placement ID, submission queue ID, command ID of write command) |

FIG. 10 nameless write command (NLW)

| | description |
|---|---|
| command ID | command ID of write command |
| superblock ID | identifier of superblock to which data is to be written |
| user address tag (UA tag) | identifier of data to be written (for example: LBA, key of key value store, or hash value of the key) |
| process ID | identifier of process requesting to write data |
| length | length of data to be written |
| data pointer | buffer address indicating a location in memory of host where data to be written is stored |

FIG. 11 flash address read command (FAR)

| | description |
|---|---|
| command ID | command ID of FAR |
| superblock ID | identifier of superblock associated with FAR |
| process ID | identifier of process associated with FAR |
| data pointer | buffer address indicating a location in memory of host to which information associated with preceding response is to be transferred |
| size | size of read buffer |

F I G. 12 preceding response (address recording request: ARR)

| | description |
|---|---|
| user address tag (UA tag) | UA tag included in corresponding write command |
| physical address | write destination location to which data associated with corresponding write command is to be written (physical address is represented by identifier of superblock and offset) |
| identification information | identification information for identifying corresponding write command (for example: superblock ID, submission queue ID, command ID of write command) |

F I G. 13 read command

| | description |
|---|---|
| command ID | command ID of read command |
| QoS domain ID | identifier of QoS domain where data to be read is stored |
| physical address | physical address indicates physical storage location where data to be read is stored.<br>physical address is represented by block address and offset |
| length | length of data to be read |
| read buffer address | location in read buffer to which data is to be transferred |

F I G. 14

QoS domain create command

| | description |
|---|---|
| command ID | command ID of QoS domain create command |
| QoS domain ID | identifier of QoS domain to be created |
| capacity | capacity of QoS domain to be created |

F I G. 15

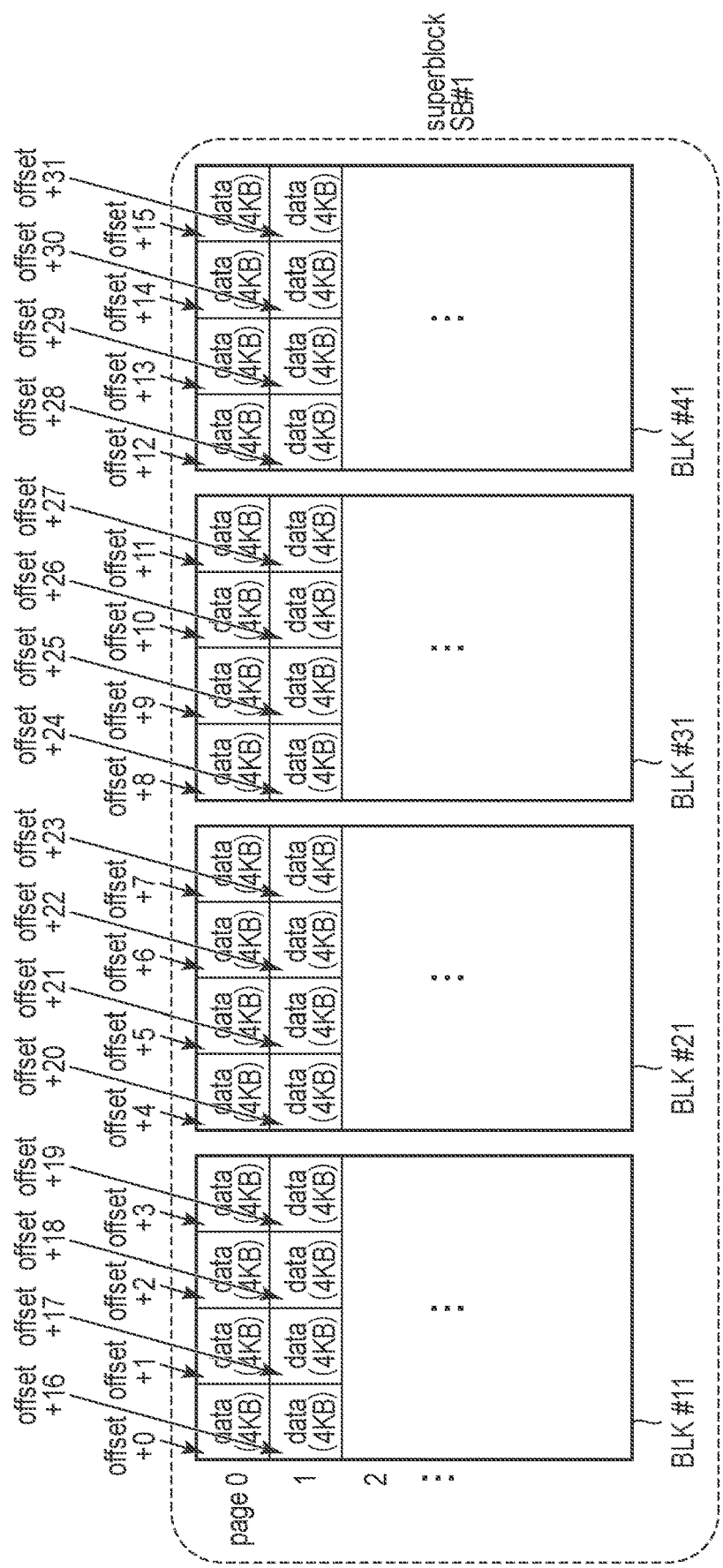
F I G. 16

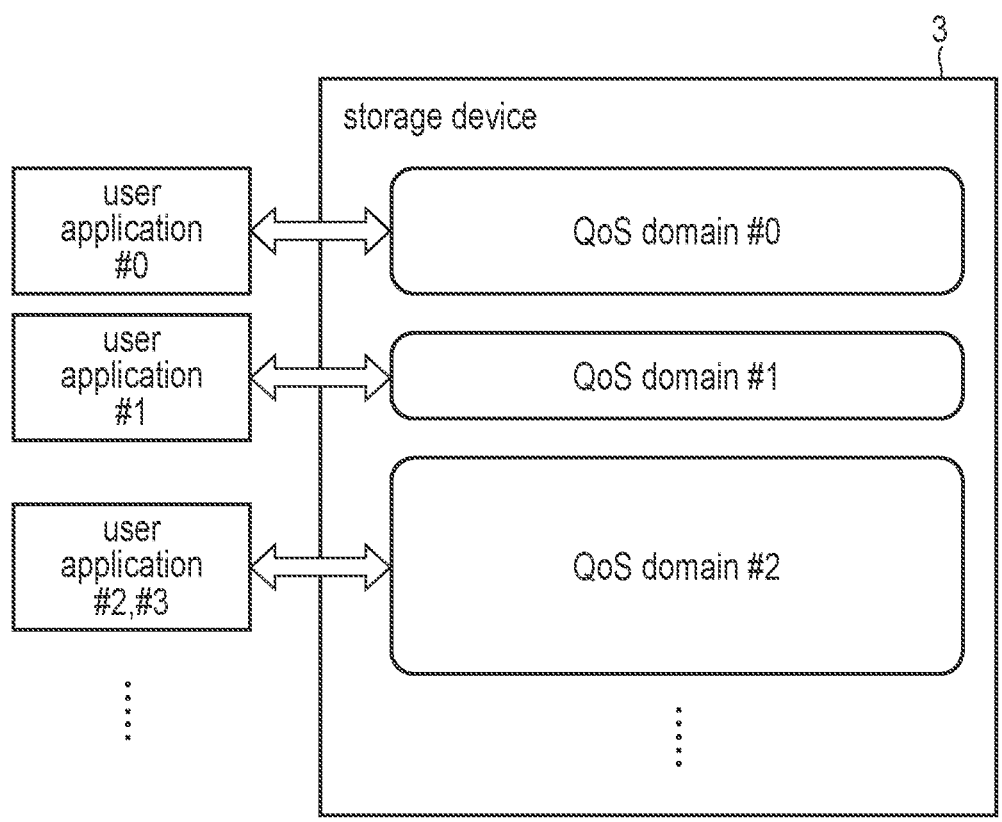
F I G. 17

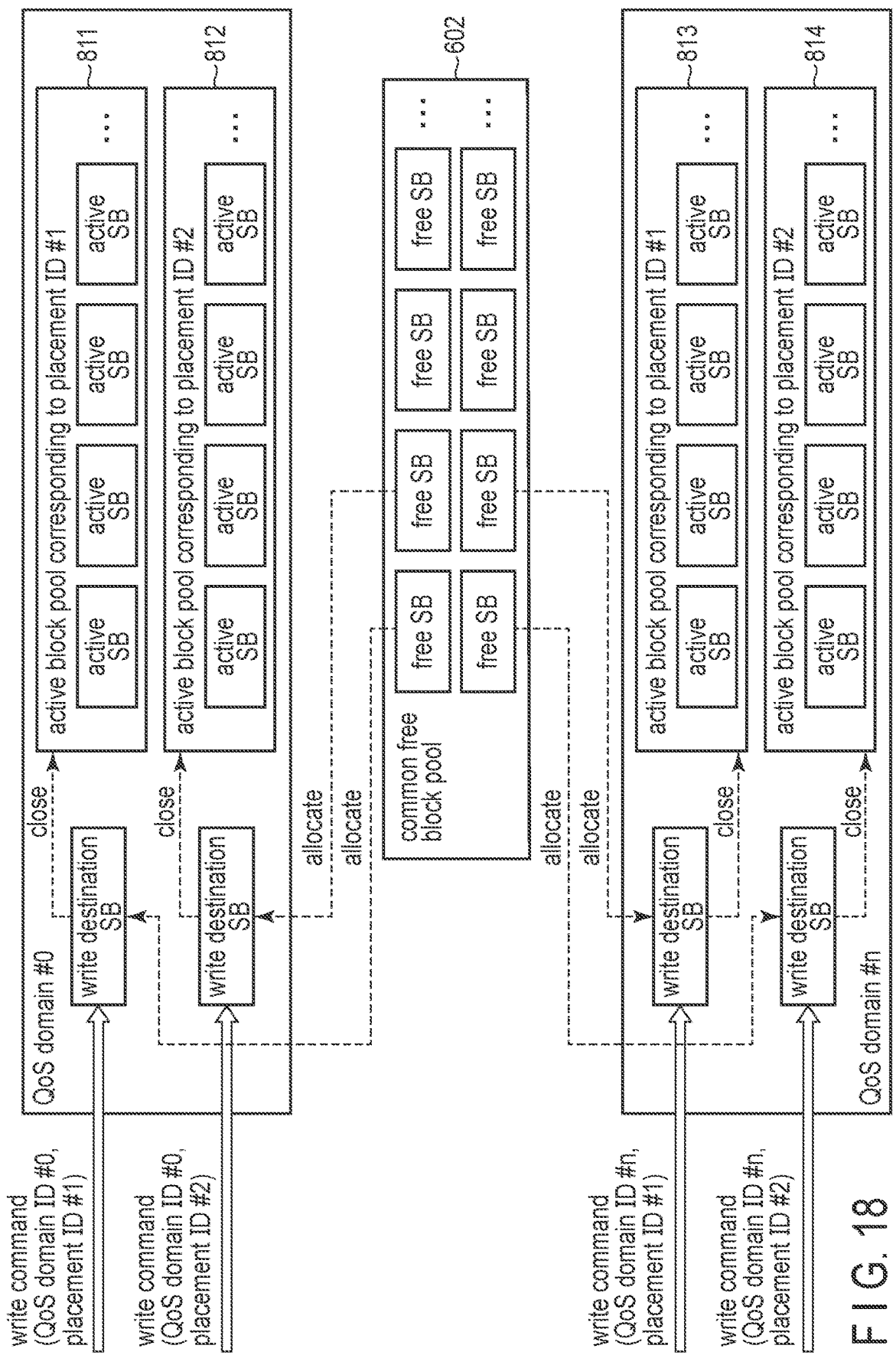
F I G. 18

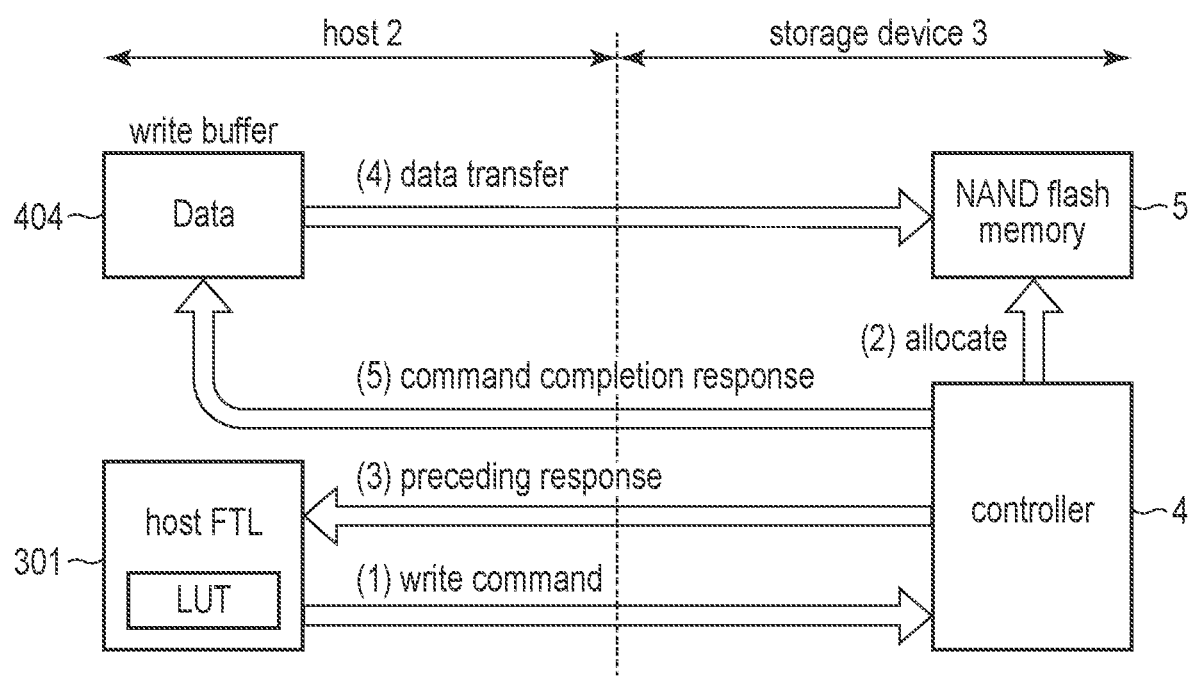
F I G. 19

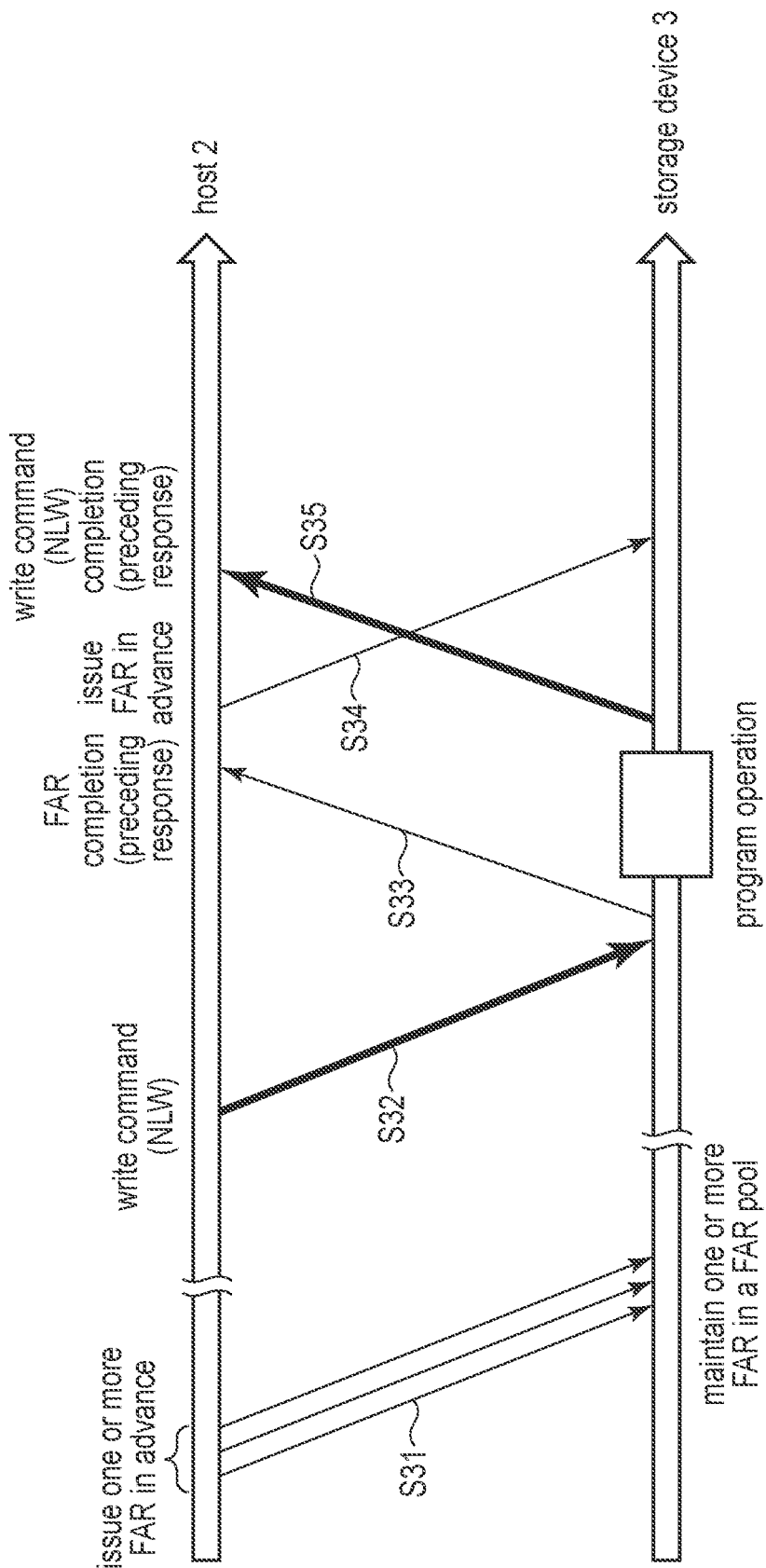
F I G. 20

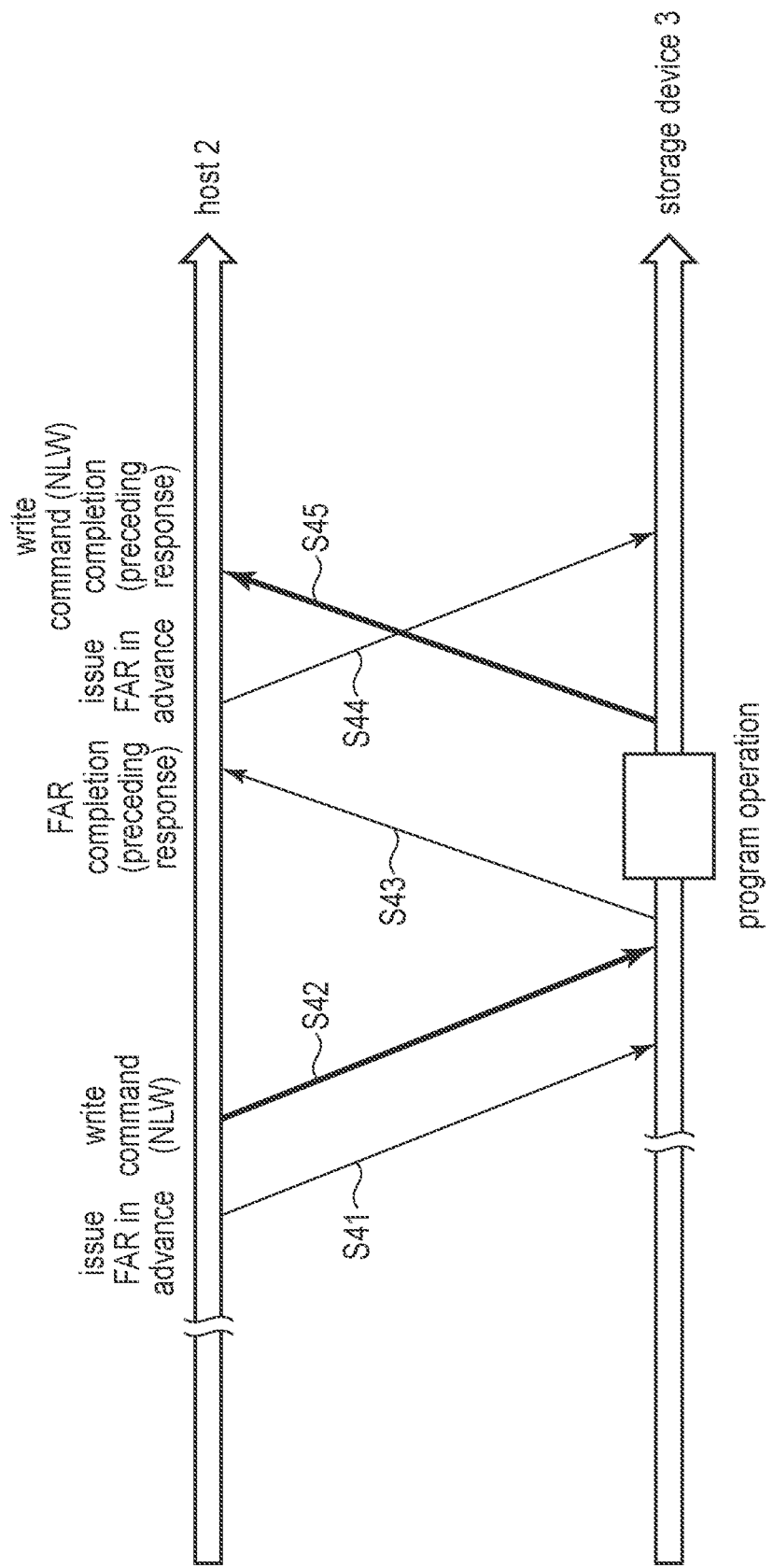
F I G. 21

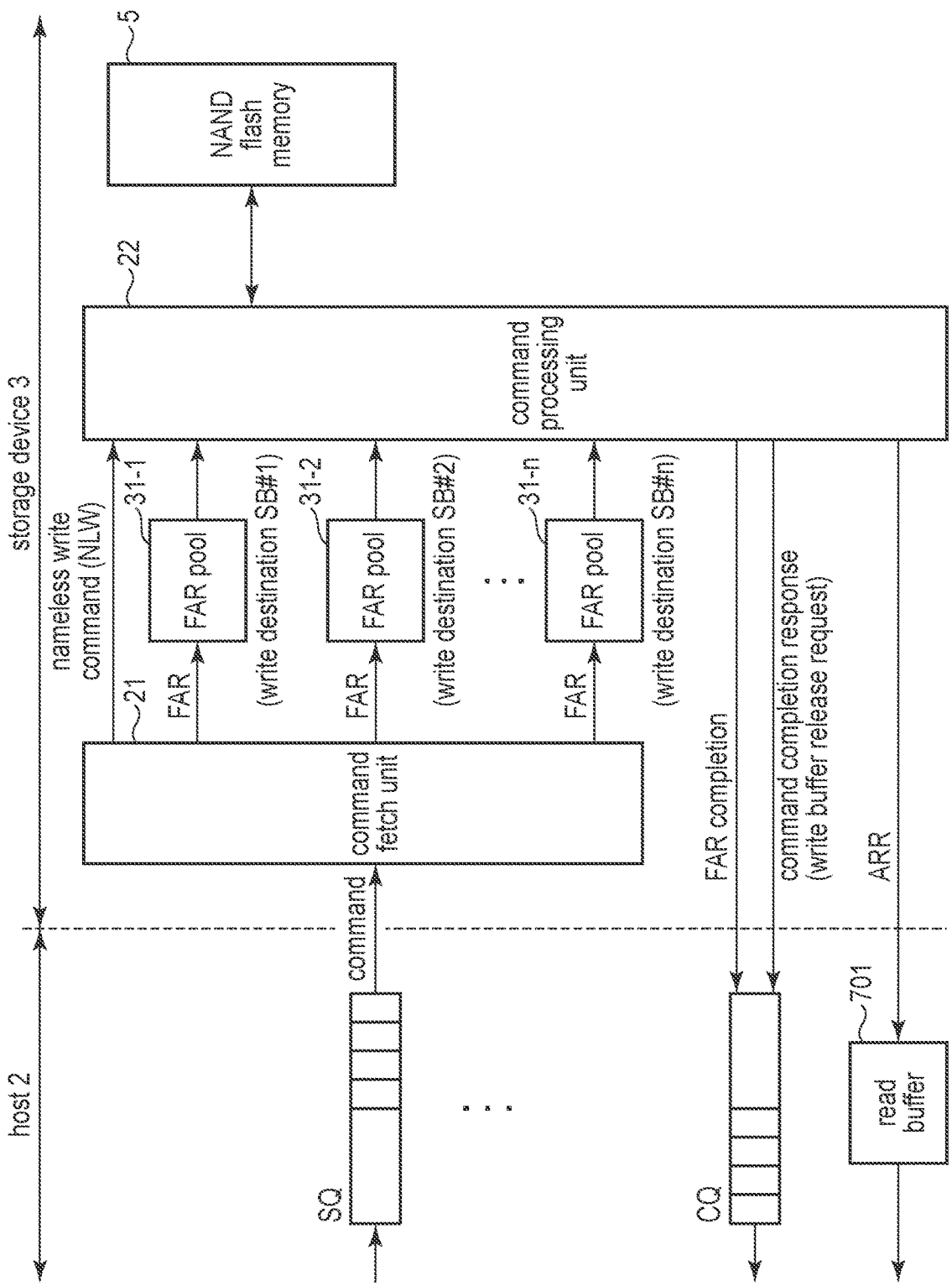
F I G. 22

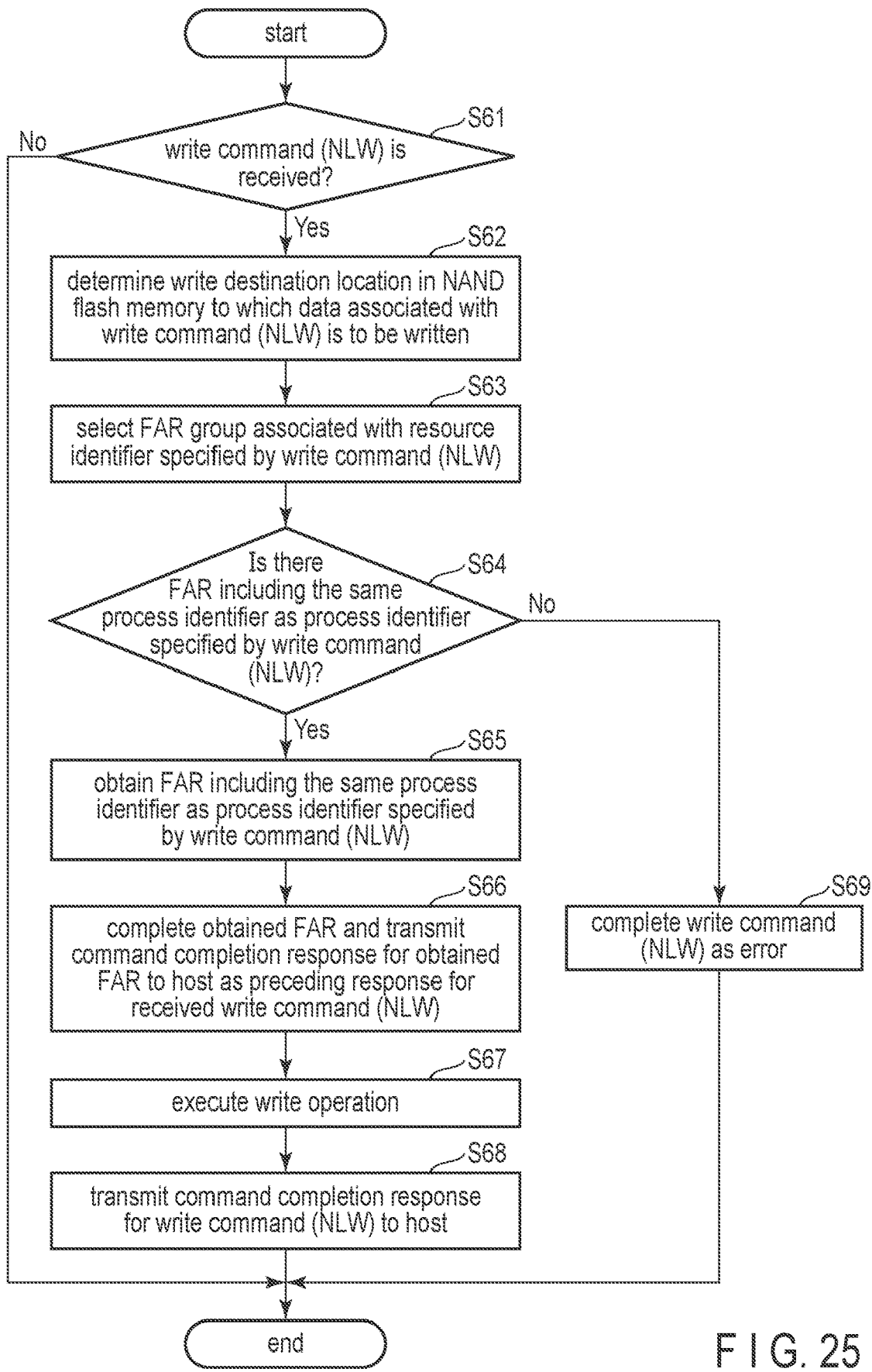
F I G. 25

STORAGE DEVICE AND STORAGE SYSTEM

CROSS-REFERENCE TO RELATED APPLICATIONS

This application is based upon and claims the benefit of priority from Japanese Patent Application No. 2022-008613, filed Jan. 24, 2022, the entire contents of which are incorporated herein by reference.

FIELD

Embodiments described herein relate generally to a technique for controlling a nonvolatile memory.

BACKGROUND

In recent years, storage devices including a nonvolatile memory have been widely used. As one of such storage devices, a solid-state drive (SSD) including a NAND flash memory is known.

In communication between a storage device such as an SSD and a host, a logical interface standard in which one completion response for one command issued from the host is allowed to be transmitted by the storage device to the host may be used.

In a storage device that executes communication with a host according to such logical interface standard, it is required to implement a new technology capable of transmitting a plurality of responses for one command to the host.

BRIEF DESCRIPTION OF THE DRAWINGS

FIG. 3 is a block diagram illustrating an example of a configuration of the host and an example of a configuration of the storage device according to the embodiment.

FIG. 4 is a block diagram illustrating a relationship between a NAND interface and a plurality of NAND flash memory dies provided in the storage device according to the embodiment.

FIG. 5 is a diagram illustrating an example of a configuration of a block group managed in the storage device according to the embodiment.

FIG. 6 is a diagram illustrating an operation of maintaining one or more second type commands transmitted in advance from the host in a pool, an operation of transmitting a completion response for one of the second type commands in the pool to the host as a preceding response for a first type command transmitted from the host, and an operation of transmitting a completion response indicating the completion of the first type command to the host in response to the completion of the first type command, which are executed in the storage device according to the embodiment.

FIG. 8 is a diagram illustrating an example of a configuration of a write command issued as a first type command to the storage device according to the embodiment.

FIG. 9 is a diagram illustrating an example of a configuration of a flash address read command issued as a second type command to the storage device according to the embodiment.

FIG. 10 is a diagram illustrating an example of a configuration of a preceding response transmitted to the host by the storage device according to the embodiment.

FIG. 11 is a diagram illustrating another example of a configuration of the write command issued as the first type command to the storage device according to the embodiment.

FIG. 12 is a diagram illustrating another example of a configuration of the flash address read command issued as the second type command to the storage device according to the embodiment.

FIG. 13 is a diagram illustrating another example of a configuration of the preceding response transmitted to the host by the storage device according to the embodiment.

FIG. 14 is a diagram illustrating an example of a configuration of a read command issued to the storage device according to the embodiment.

FIG. 15 is a diagram illustrating an example of a configuration of a Quality of Service (QoS) domain create command issued to the storage device according to the embodiment.

FIG. 16 is a diagram illustrating a relationship between a block address and an offset in a case where a block group is used.

FIG. 17 is a diagram illustrating a plurality of QoS domains managed in the storage device according to the embodiment.

FIG. 18 is a block diagram illustrating a relationship between a plurality of QoS domains and a common flash block pool that are managed in the storage device according to the embodiment.

FIG. 19 is a block diagram for explaining a data write process executed by the host and the storage device according to the embodiment.

FIG. 20 is a diagram illustrating an operation of maintaining one or more flash address read commands (FAR) transmitted in advance from the host in an FAR pool, an operation of transmitting a completion response for one of the flash address read commands in the FAR pool to the host as a preceding response for a write command transmitted from the host, and an operation of transmitting a completion response indicating the completion of the write command to the host in response to the completion of the write command, which are executed in the storage device according to the embodiment.

FIG. 21 is a diagram illustrating an operation of maintaining one flash address read command (FAR) transmitted in advance from the host in an FAR pool, an operation of transmitting, to the host, a completion response for the flash address read command in the FAR pool as a preceding response for a write command transmitted from the host, and an operation of transmitting a completion response indicating the completion of the write command to the host in response to the completion of the write command, which are executed in the storage device according to the embodiment.

FIG. 22 is a block diagram illustrating an operation of maintaining one or more flash address read commands (FAR) specifying the same memory resource in the same FAR pool, an operation of transmitting a preceding response for a write command to the host using a flash address read command (FAR) maintained in an EAR pool corresponding to a memory resource specified by the write command, and an operation of transmitting a completion response for the write command to the host, which are executed in the storage device according to the embodiment.

FIG. 25 is a flowchart illustrating a procedure of processing a write command, which is executed in the storage device according to the embodiment.

DETAILED DESCRIPTION

Various embodiments will be described hereinafter with reference to the accompanying drawings.

In general, according to one embodiment, a storage device is capable of communicating with a host in accordance with a predetermined interface standard in which one completion response for one command issued from the host is allowed to be transmitted by the storage device to the host. The storage device comprises a nonvolatile memory, and a controller configured to transmit, to the host, one or more preceding responses for a first type command requesting the storage device to execute a first operation and a command completion response indicating that processing of the first type command is completed. The one or more preceding responses include at least a first preceding response indicating that the first type command has been received, and each of the one or more preceding responses is a response transmitted to the host by the storage device before the transmission of the command completion response. In response to receiving, from the host, one or more second type commands for enabling a preceding response to be transmitted by the storage device to the host, the controller maintains the received one or more second type commands in a memory region in the storage device without completing processing of the received one or more second type commands. In response to receiving the first type command from the host, the controller obtains a second type command among the one or more second type commands from the memory region, complete processing of the obtained second type command, and transmit a command completion response for the second type command to the host as the first preceding response for the first type command. In response to completion of processing of the first type command, the controller transmits the command completion response for the first type command to the host.

Figure 1:
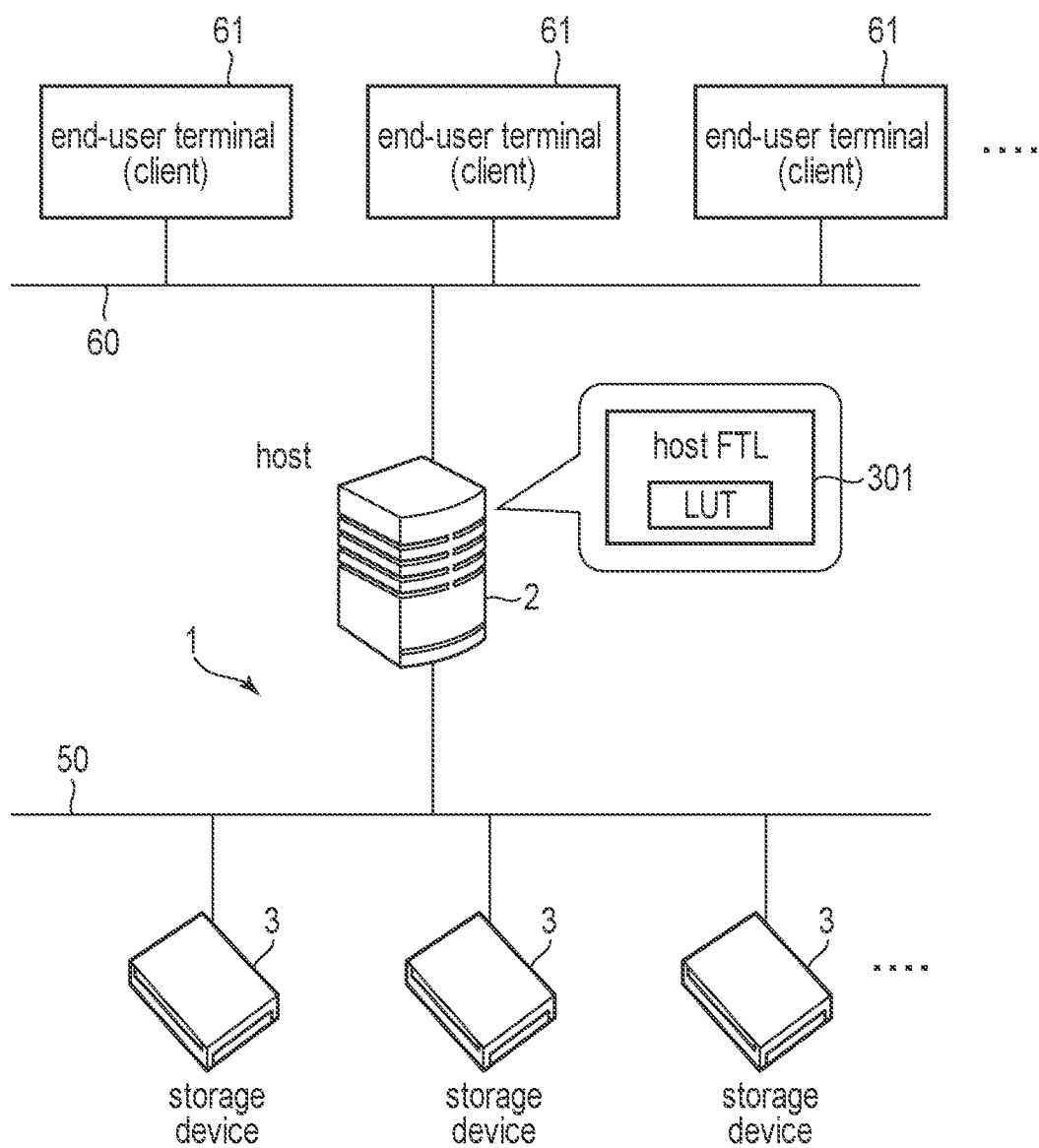
FIG. 1 is a block diagram illustrating an example of a configuration of a storage system including a storage device according to an embodiment.

FIG. 1 is a block diagram illustrating an example of a configuration of a storage system including a storage device according to an embodiment.

The storage system 1 includes a host (host device) 2 and a storage device 3. The host (host device) 2 is an information processing apparatus configured to access one or a plurality of storage devices 3. The information processing apparatus is, for example, a personal computer or a server computer.

Hereinafter, a case where an information processing apparatus such as a server computer is used as the host 2 will be mainly described.

A typical example of the server computer functioning as the host 2 is a server computer (hereinafter referred to as a server) in a data center.

In a case where the host 2 is implemented by a server in a data center, the host 2 may be connected to a plurality of end-user terminals (clients) 61 via a network 60. The host 2 can provide various services to the end-user terminals 61.

Examples of the services that can be provided by the host 2 include (1) Platform as a Service (PaaS) that provides a system operation platform to each client (each end-user terminal 61), and (2) Infrastructure as a Service (IaaS) that provides an infrastructure such as a virtual server to each client (each end-user terminal 61).

A plurality of virtual machines may be executed on a physical server functioning as the host 2. Each of the virtual machines running on the host 2 can function as a virtual server configured to provide various services to a client (end-user terminal 61) corresponding to this virtual machine. In each virtual machine, an operating system and a user application that are used by the end-user terminal 61 corresponding to the virtual machine are executed.

In the host (server) 2, a flash translation layer (host FTL) 301 is also executed. The host FTL 301 includes a lookup table (LUT) which is an address conversion table that manages mapping between each of data identifiers and each of physical addresses of a nonvolatile memory in the storage device 3. The host FTL 301 can recognize the data placement on the nonvolatile memory in the storage device 3 by using the LUT.

The storage device 3 is a semiconductor storage device configured to write data to the nonvolatile memory and read data from the nonvolatile memory.

The storage device 3 can execute low-level abstraction. The low-level abstraction is a function for abstraction of the nonvolatile memory. The low-level abstraction includes a function of assisting the data placement, and the like. The function of assisting the data placement includes, for example, a function of allocating a physical address indicating a physical storage location in the nonvolatile memory to which user data is to be written, to a write command transmitted from the host 2, and a function of notifying the upper layer (host 2) of the allocated physical address.

The storage device 3 is connected to the host. 2 via a cable or a network. Alternatively, the storage device 3 may be included in the host 2.

Communication between the host 2 and the storage device 3 is executed using a logical interface standard in which one completion response for one command issued from the host 2 is allowed to be transmitted by the storage device 3 to the host 2. The storage device 3 executes communication with the host 2 in accordance with the logical interface standard. The logical interface standard is, for example, a standard of NVM Express™ (NVMe™). When the NVMe standard is used as the logical interface standard, for example, PCI Express™ (PCIe™) or Ethernet™ is used as a physical interface 50 connecting the storage device 3 and the host 2.

Figure 2:
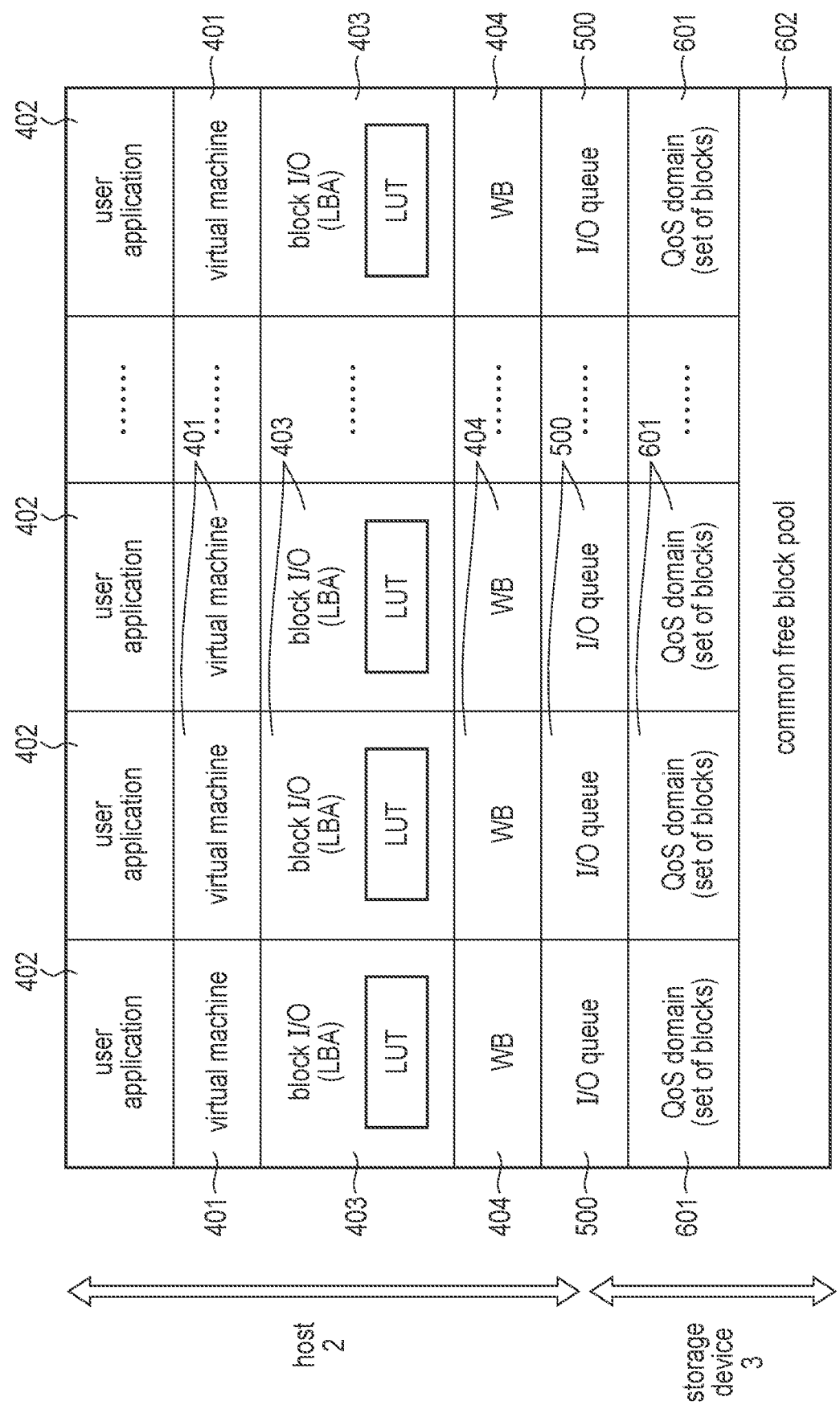
FIG. 2 is a diagram for explaining role sharing between a host and the storage device according to the embodiment.

Next, the role of the host 2 and the role of the storage device 3 will be described. FIG. 2 is a diagram illustrating role sharing between the storage device 3 and the host 2.

In the host (server) 2, a plurality of virtual machines 401 corresponding to a plurality of end users are executed. In each virtual machine 401, an operating system and a user application 402 that are used by a corresponding end user are executed.

In the host (server) 2, a plurality of I/O services 403 corresponding to a plurality of user applications 402 are executed. The I/O services 403 may include a logical block address (LBA)-based block I/C, service, a key-value store service, and the like. Each I/O service 403 includes a lookup table (LUT) that manages mapping between each of user address tags and each of physical addresses of the storage device 3.

Here, the user address tag means a data identifier capable of identifying data to be accessed. An example of the user address tag is, but is not limited to, a logical address such as a logical block address (LBA). Alternatively, a key of key value store, a hash value of this key, or the like may be used as the user address tag.

The physical address of the storage device 3 is an address for specifying a storage location (physical storage location) in the nonvolatile memory included in the storage device 3.

In the LBA-based block I/O service, an LUT that manages mapping between each of logical addresses (LBAs) and each of physical addresses of the storage device 3 may be used.

On the other hand, in the key-value store service, an LUT that manages mapping between each key (or a hash value of each key), each physical address of the storage device 3 at which data corresponding to the key is stored, and each data length of the data corresponding to the key may be used.

Each end user can select an addressing method (LBA, key of key value store, hash value of this key, or the like) to be used.

In the host (server) 2, a plurality of write buffers (WB) 404 corresponding to the plurality of virtual machines 401 may be managed. Write data from a certain user application 402 may be temporarily stored in a write buffer (WB) 404 for a virtual machine 401 corresponding to the user application 402.

The transmission of a command from the host (server) 2 to the storage device 3 and the return of a command completion response from the storage device 3 to the host (server) 2 are executed via an I/O queue 500. Commands transmitted from the host 2 to the storage device 3 include a write command, a read command, and the like. The write command is a command for writing data to the nonvolatile memory in the storage device 3. The read command is a command for reading, from the nonvolatile memory, read target data.

The storage device 3 manages a plurality of memory resources included in the nonvolatile memory in the storage device 3. The plurality of memory resources are, for example, a plurality of regions obtained by logically dividing the nonvolatile memory. Each of the plurality of regions is managed as a Quality of Service (QoS) domain 601. Each of the QoS domains 601 is a subset of a plurality of block groups included in the nonvolatile memory.

Each of the plurality of block groups includes one or more blocks among a plurality of blocks (physical blocks) included in the nonvolatile memory. Each of the plurality of block groups is also referred to as a superblock.

Each of the plurality of block groups belongs to only one QoS domain 601, and the same block group does not simultaneously belong to different QoS domains 601. As a result, for example, by allocating different QoS domains 601 to different end users, it is possible to implement data placement in which data of different end users are written to different physical storage regions.

Each of the QoS domains 601 is identified by an identifier called a QoS domain ID. The QoS domain IDs are used as a plurality of identifiers for accessing the plurality of regions (plurality of QoS domains).

Alternatively, the plurality of memory resources may be a plurality of block groups (superblocks) included in the nonvolatile memory. Also in this case, it is possible to implement data placement in which data of different end users are written to different superblocks. Each superblock is identified by an identifier called a superblock ID.

The storage device 3 manages a common free block pool 602. The common free block pool is used to manage a set of free superblocks shared by the plurality of Qos domains 601.

Each of the free superblocks means a superblock in a state (free state) in which the superblock can be used as a new write destination superblock. Each of the free superblocks is a superblock that does not store valid data. The valid data means the latest data associated with a user address tag such as an LBA. That is, data linked as the latest data from the LUT of the host 2 is valid data. The invalid data means data that is not associated with a user address tag such as an LBA. For example, when update data corresponding to a certain LBA is written to the storage device 3, the previous data corresponding to this LBA becomes invalid.

The storage device 3 allocates one of the free superblocks in the common free block pool 602 as a write destination superblock for each QoS domain. The write destination superblock is a superblock to which data is to be written. Further, for each QoS domain, the storage device 3 can simultaneously allocate two or more write destination superblocks among the free superblocks in the common free block pool 602.

In this case, a plurality of region identifiers called placement IDs are set for each QoS domain. For example, when a placement ID 1 and a placement ID 2 are set for a QoS domain #1, the storage device 3 allocates one of the free superblocks in the common free block pool 602 as a write destination superblock for the placement ID 1 of the QoS domain #1.

Further, the storage device 3 allocates another one of the free superblocks in the common free block pool 602 as a write destination superblock for the placement ID 2 of the QoS domain #1.

Upon receiving a write command specifying the QoS domain #1 and the placement ID 1 from the host 2, the storage device 3 writes data associated with the received write command to the write destination superblock for the placement ID 1 of the QoS domain #1.

Upon receiving a write command specifying the QoS domain #1 and the placement ID 2 from, the host 2, the storage device 3 writes data associated with the received write command to the write destination superblock for the placement ID 2 of the QoS domain #1.

As a result, the data associated with the placement ID 1 of the QoS domain #1 and the data associated with the placement ID 2 of the QoS domain #1 can be written to the different regions in the QoS domain #1.

Next, the configuration of the host and the configuration of the storage device will be described. FIG. 3 is a block diagram illustrating an example of a configuration of the host and an example of a configuration of the storage device according to the embodiment.

The host 2 includes a processor 101 and a memory 102. The processor 101 is a central processing unit (CPU) configured to control each component in the host 2. The processor 101 executes software (host software) loaded in the memory 102 from the storage device 3 or another storage device in the host 2. The host software includes an operating system, a file system, a device driver, an application program, and the like.

The memory 102 is a main memory provided in the host 2. The memory 102 is a volatile semiconductor memory in which stored contents are lost when supply of power is stopped. The memory 102 is, for example, a random access memory such as a dynamic random access memory (DRAM).

A part of the memory region of the memory 102 is used to store one or more pairs (SQ/CQ pairs) of submission queues and completion queues. FIG. 3 illustrates a case where a plurality of SQ/CQ pairs are stored in a part of the memory region of the memory 102. Each SQ/CQ pair includes at least one submission queue (SQ) and a completion queue (CQ) associated with the at least one submission queue (SQ).

The submission queue (SQ) is a queue to be used to issue a command to the storage device 3. The completion queue (CQ) is a queue to be used to receive a command, from the storage device 3, a completion response indicating completion of a command.

In the interface of the NVMe standard, each command is issued from the host 2 to the storage device 3 using at least one SQ/CQ pair and each command completion is transmitted from the storage device 3 to the host 2 using at least one SQ/CQ pair.

In this case, each command is stored in any submission queue (SQ) by the host 2. When processing of a certain command is completed, a command completion response (also referred to as "command completion", "completion", or "completion message") indicating the completion of the command is stored in a completion queue (CQ) by a controller 4 of the storage device 3. This completion queue (CQ) is a completion queue which is associated with the submission queue (SQ) used for issuing this command.

The storage device 3 includes the controller 4 and the nonvolatile memory (for example, a NAND flash memory 5). The storage device 3 may also include a random access memory, for example, a DRAM 6.

The NAND flash memory 5 includes a memory cell array including a plurality of memory cells arranged in a matrix. The NAND flash memory 5 may be a flash memory having a two-dimensional structure or a flash memory having a three-dimensional structure.

The memory cell array of the NAND flash memory 5 includes a plurality of blocks BLK0 to BLKx−1. Each of the blocks BLK0 to BLKx−1 includes a plurality of pages (here, pages P0 to Py−1). Each page includes a plurality of memory cells connected to the same word line. Each of the blocks BLK0 to BLKx−1 is a unit for data erase operation for erasing data. Each of the pages P0 to Py−1 is a unit of data write operation and data read operation.

The controller 4 is a memory controller configured to control the NAND) flash memory 5. The controller 4 may be implemented by a circuit such as a system-on-a-chip (SoC). Although not limited thereto, the controller 4 is electrically connected to the NAND flash memory 5 via a NAND interface 13 conforming to Toggle NAND flash interface or open NAND flash interface (ONFI).

The controller 4 includes a host interface 11, a CPU 12, a DRAM interface 14, a direct memory access controller (DMAC) 15, a static RAM (SRAM) 16, and an ECC encoding/decoding unit 17 in addition to the NAND interface 13 described above. The host interface 11, the CPU 12, the NAND interface 13, the DRAM interface 14, the DMAC 15, the SRAM 16, and the ECC encoding/decoding unit 17 are interconnected via a bus 10.

The host interface 11 is a host interface circuit configured to execute communication with the host 2. The host interface 11 is, for example, a PCIe controller. Alternatively, when the storage device 3 includes a network interface controller, the host interface 11 may be implemented as a part of the network interface controller.

The host interface 11 executes communication with the host 2 in accordance with the NVMe standard, for example. The host interface 11 includes an arbitration mechanism. This arbitration mechanism is a mechanism for selecting a submission queue into which a command is to be fetched from among a plurality of submission queues included in the memory 102 of the host 2. The arbitration mechanism may be a round robin arbitration mechanism or a weighted round robin arbitration mechanism. Then, the host interface 11 fetches one or more commands from the submission queue selected by the arbitration mechanism under the control of the CPU 12.

The CPU 12 is a processor configured to control the host interface 11, the NAND interface 13, the DRAM interface 14, the DMAC 15, the SRAM 16, and the ECC encoding/decoding unit 17. The CPU 12 performs various processes by executing a control program (firmware). The CPU 12 loads the control program (firmware) from a ROM (not illustrated) or the NAND flash memory 5 into the SRAM 16 or the DRAM 6 according to the supply of power to the storage device 3.

The NAND interface 13 is a NAND controller configured to control the NAND flash memory 5 under the control of the CPU 12. When the NAND flash memory 5 includes a plurality of NAND flash memory dies (NAND flash memory chips), the NAND interface 13 may be connected to the NAND flash memory dies via a plurality of channels (Ch).

The DRAM interface 14 is a DRAM controller configured to control the DRAM 6 under the control of the CPU 12.

A part of the memory region of the DRAM 6 is used to store a flash address read (FAR) pool 31 and a block management table 32. The FAR pool 31 is used as a memory region for maintaining each of specific commands issued from the host 2 without completing the specific commands. The block management table 32 is used to manage information indicating the state of each of the plurality of superblocks. The information indicating the state of each of the superblocks includes, for example, information indicating the number of times of erasure of each superblock, information indicating whether each superblock is an active block or a free block, and the like.

An internal buffer 161 is used as a memory region for temporarily storing data received from the host. 2 and data to be transmitted to the host 2. The internal buffer 161 is allocated, for example, in a memory region of the SRAM 16. Alternatively, the internal buffer 161 may be allocated in a memory region of the DRAM 6.

The DMAC 15 executes data transfer between the memory 102 of the host 2 and the internal buffer 161 under the control of the CPU 12.

When data is to be written to the NAND flash memory 5, the ECC encoding/decoding unit 17 encodes the data (data to be written) to add an error correction code (ECC) as a redundant code to the data. When data is read from the NAND flash memory 5, the ECC encoding/decoding unit 17 performs error correction on the data using an ECC added to the read data.

Next, a detailed configuration of the CPU 12 will be described. For each first type command, the CPU 12 executes a multiphase completion response process of transmitting, to the host 2, one or more preceding responses for the first type command and a command completion response indicating that the first type command has been completed.

For example, a two-phase completion response process is executed. In the two-phase completion response process, a first preceding response is transmitted to the host 2 by the controller 4 when the controller 4 receives a first type command, and a command completion response is transmitted to the host 2 by the controller 4 when the processing of the first type command is completed.

Alternatively, a three-phase completion response process may be executed in which a first preceding response is transmitted to the host 2 by the controller 4 when the controller 4 receives a first type command, a second preceding response is transmitted to the host 2 by the controller 4 when the processing of the first type command is started, and a command completion response is transmitted to the host 2 by the controller 4 when the processing of the first type command is completed.

Alternatively, a four-phase completion response process may be executed in which a first preceding response is transmitted to the host 2 by the controller 4 when the controller 4 receives a first type command, a second preceding response is transmitted to the host 2 by the controller 4 when the processing of the first type command is started, a third preceding response is transmitted to the host 2 by the controller 4 when the processing of the first type command is suspended, and a command completion response is transmitted to the host 2 by the controller 4 when the processing of the first type command is completed.

By executing the multiphase completion response process, the controller 4 can notify the host 2 of information relating to the processing of the first type command as one preceding response for the first type command even when the time required from the reception of the first type command to the completion of the processing of the first type command is long.

In order to implement the multiphase completion response process, the CPU 12 functions as a command fetch unit 21 and a command processing unit 22. A part or all of each of the command fetch unit 21 and the command processing unit 22 may be implemented by dedicated hardware in the controller 4.

The command fetch unit 21 fetches a command issued by the host 2 from a submission queue (SQ). In the present embodiment, when the fetched command is a first type command, the command fetch unit 21 transmits the fetched command to the command processing unit 22. The first type command is a specific type of command that requests the storage device 3 to execute a predetermined process.

When the fetched command is a second type command, the command fetch unit 21 maintains the fetched command in the FAR pool 31 without completing the fetched command. The second type command is a command for enabling one of one or more preceding responses for a first type command to be transmitted to the host 2 by the storage device 3.

Each of the one or more preceding responses is a response transmitted to the host 2 by the storage device 3 before the transmission of a command completion response indicating that the first type command has been completed. The one or more preceding responses include at least a first preceding response indicating that the first type command has been received by the controller 4. Furthermore, the one or more preceding responses may include, for example, a second preceding response indicating the start of the processing of the first type command in addition to the first preceding response. Furthermore, the one or more preceding responses may include, for example, a third preceding response indicating the suspension of the processing of the first type command in addition to the first preceding response and the second preceding response.

In order to receive each of the one or more preceding responses for the first type command from the storage device 3, the host 2 issues one or more second type commands to the storage device 3 in advance before issuing the first type command to the storage device 3.

In the controller 4, each of the one or more second type commands issued from the host 2 is not immediately completed and is maintained in the FAR pool 31 which is a memory region in the storage device 3. Upon receiving the first type command from the host 2, the controller 4 completes one of the second type commands maintained in the FAR pool 31 in order to transmit the first preceding response to the host 2.

More specifically, when the first type command is received from the host 2, the command processing unit 22 obtains one second type command among the one or more second type commands, from the FAR pool 31. Then, the command processing unit 22 completes the obtained one second type command and transmits, to the host 2, a command completion response for the completed one second type command as the first preceding response for the first type command.

In this case, the command completion response for the second type command may include information representing the first preceding response and may be stored in one entry (completion queue entry) in the completion queue (CQ).

The size of one completion queue entry is 16 bytes. Therefore, when a configuration is used in which a command completion response for a second type command includes information indicating a first preceding response and is stored in one completion queue entry, the maximum size of the information indicating the first preceding response for a first type command is limited to a relatively small size.

In the present embodiment, for example, a kind of read command with data transfer from the controller 4 to the host 2 is used as the second type command. The second type command, which is a kind of read command, includes a pointer indicating a buffer region that is included in the memory 102 of the host 2 and to which information is to be transferred.

In this case, information regarding the processing of the first type command can be transferred to the buffer region indicated by the pointer as the first preceding response. The size of the buffer region included in the memory 102 can be set to a sufficiently large size. Therefore, by transferring the information regarding the processing of the first type command to the buffer region of the memory 102 as the first preceding response, it is possible to increase the amount of information that can be notified to the host 2 as the first preceding response.

Then, when the processing of this first type command is completed, the command processing unit 22 transmits a command completion response indicating the completion of this first type command to the host 2. In this case, the command completion response indicating the completion of this first type command is stored in one completion queue entry.

As described above, in the present embodiment, the second type command for enabling the storage device 3 to transmit the preceding response for the first type command to the host 2 is issued in advance by the host 2 to the storage device 3. Then, upon receiving the first type command issued from the host 2, the controller 4 of the storage device 3 completes one of second type commands issued in advance, and transmits a command completion response for the completed second type command to the host 2 as a first preceding response which is one of preceding responses for the first type command.

Next, a case where a kind of read command with data transfer from the controller 4 to the host 2 is used as a second type command will be described.

In this case, each of the one or more second type commands includes a pointer indicating a buffer region that is included in the memory 102 and to which information is to be transferred.

When the first type command is received from the host 2, the command processing unit 22 obtains one second type command among the one or more second type commands from the FAR pool 31. Then, the command processing unit 22 completes the obtained one second type command, and executes (1) an operation of transmitting a command completion response for the completed one second type command to the host 2, and (2) an operation of transferring, as the first preceding response, information regarding the processing of the first type command to a buffer region included in the memory 102 and indicated by the pointer included in the second type command.

That is, the command completion response for the second type command is stored in the completion queue (CQ). On the other hand, the information regarding the processing of the first type command is transferred as the first preceding response to the buffer region in the memory 102.

As described above, by using a kind of read command with data transfer from the controller 4 to the host 2 as the second type command, it is possible to transfer the preceding response for the first type command to the buffer region included in the memory 102 and having a larger size than that of the completion queue (CQ) entry. Therefore, various types of information regarding the processing of the first type command can be transmitted to the host 2 as a preceding response for the first type command.

Next, a configuration using a plurality of FAR pools corresponding to a plurality of memory resources included in the NAND flash memory 5 will be described.

The plurality of memory resources are, for example, a plurality of regions included in the NAND flash memory 5 and identified by a plurality of QoS domain IDs. Alternatively, the plurality of memory resources may be, for example, a plurality of superblocks included in the NAND flash memory 5 and identified by a plurality of superblock IDs.

Each of the first type commands includes (1) a parameter specifying a processing target memory resource among the plurality of memory resources included in the NAND flash memory 5 and (2) a parameter specifying a process identifier (process ID) indicating a process requesting the execution of processing corresponding to the first type command among a plurality of processes executed by the host 2.

The controller 4 manages the plurality of FAR pools which are a plurality of memory regions associated with the plurality of memory resources. The command fetch unit 21 receives, from the host 2, a plurality of second type commands each including a parameter specifying one memory resource among the plurality of memory resources and a parameter specifying a process identifier indicating one of the plurality of processes. The command fetch unit 21 maintains each of the plurality of received second type commands in a FAR pool among the plurality of FAR pools based on the memory resource specified by each of the plurality of received second type commands such that second type commands specifying the same memory resource are maintained in the same FAR pool.

That is, each of second type commands specifying a memory resource #1 is maintained in an FAR pool #1 corresponding to the memory resource #1. Similarly, each of second type commands specifying a memory resource #2 is maintained in an FAR pool #2 corresponding to the memory resource #2.

When a first type command is received from the host 2, the command processing unit 22 first selects an FAR pool there, a first FAR pool) corresponding to a processing target memory resource specified by the received first type command, from among the plurality of FAR pools. The command processing unit 22 obtains, among second type commands maintained in the selected first FAR pool, a second type command specifying the same process identifier as the process identifier specified by the received first type command. As a result, it is possible to easily obtain the second type command that specifies the same resource identifier as the resource identifier specified by the received first type command and specifies the same process identifier as the process identifier specified by the received first type command.

Then, the command processing unit 22 completes the obtained second type command and transmits a command completion response for the completed second type command to the host 2 as the first preceding response for the received first type command. In a case where the obtained second type command includes a data pointer indicating a buffer region that is included in the memory 102 of the host 2 and to which information is to be transferred, the command processing unit 22 transfers information regarding the processing of the received first type command to this buffer region in the memory 102 as the first preceding response for the received first type command. For example, the command processing unit 22 transmits a memory write request to the host 2. As a result, the command processing unit 22 stores the information regarding the processing of the received first type command in the buffer region included in the memory 102 and indicated by the data pointer via the processor 101 of the host 2. As a result, it is possible to prevent a process other than the process requesting the execution of the processing corresponding to the first type command from referring to the information regarding the processing of the first type command.

Each of the one or more preceding responses also includes identification information included in the received first type command. When the received first type command includes a resource identifier for identifying the processing target memory resource among the plurality of memory resources included in the NAND flash memory 5, the identification information included in each of the one or more preceding responses for the received first type command includes the resource identifier included in the received first type command. In addition, the identification information included in each of the one or more preceding responses for the first type command includes at least one of a submission queue ID (SQID) that is an identifier for identifying a submission queue (SQ) from which the first type command is fetched, a command ID that is a command identifier for identifying the received first type command, and any numerical value given to the first type command by the host 2.

Note that, in a case where a second type command specifying the same process identifier as the process identifier specified by the received first type command is not present among one or more second type commands maintained in the selected first FAR pool, the command processing unit 22 completes the received first type command as an error. In this case, the command processing unit 22 transmits a command completion response for the first type command to the host 2. The command completion response includes a status indicating the error of the received first type command.

Next, an operation of completing, as an error, each of incomplete second type commands maintained in a specific FAR pool will be described.

The controller 4 manages whether each of the plurality of memory resources is in an available state or an unavailable state. For example, when each of the plurality of memory resources is a superblock, a superblock including an unwritten region is in an available state. A superblock entirely filled with data, that is, a superblock not including an unwritten region is in an unavailable state.

When a plurality of first type commands each specifying a first memory resource are received and processed by the controller 4, the first memory resource transitions from an available state to an unavailable state. For example, when a plurality of write commands each specifying a certain superblock are received and processed by the controller 4, this superblock transitions from an available state to an unavailable state.

When the first memory resource transitions from the available state to the unavailable state, the command processing unit 22 completes, as an error, each of incomplete second type commands maintained in one FAR pool corresponding to the first memory resource among the plurality of FAR pools. In this case, regarding each of these second type commands, the command processing unit 22 transmits a command completion response for the second type command to the host 2. This command completion response for the second type command includes a status indicating an error of the second type command.

Next, an example of a command used as a first type command will be described. In the present embodiment, a type of write command (nameless write command: NLW command) that specifies a processing target memory resource to which data (write data) is to be written and does not specify a write destination location in the processing target memory resource is used as a first type command.

The write command includes a parameter specifying a memory resource ID, a parameter specifying a data identifier such as a user address tag, and a parameter specifying a process ID. The parameter specifying the memory resource ID specifies one memory resource among the plurality of memory resources as a processing target memory resource to which data (write data) is to be written. The parameter specifying the data identifier specifies the data identifier of the write data.

When the write command is received from the host 2, the command processing unit 22 allocates, to the received write command, a physical address (flash address) indicating a physical storage location in the processing target memory resource to which the write data is to be written, that is, a write destination location in the processing target memory resource. The allocated physical address is represented by a resource identifier for identifying the processing target memory resource and an offset from the head of the processing target memory resource to the write destination location. Before starting a program operation (also referred to as a write operation or a flash write process) of writing the write data to the allocated physical address, the command processing unit 22 transmits the allocated physical address and the data identifier to the host 2 as a first preceding response.

In this case, the command processing unit 22 obtains, from the FAR pool 31, one second type command specifying the same memory resource ID and process ID as the memory resource ID and the process ID that are specified by the received write command. The command processing unit 22 completes the obtained one second type command, and executes (1) an operation of transmitting a command completion response for the completed one second type command to the host 2 and (2) an operation of transferring the allocated physical address and the data identifier to a buffer region in the memory 102 provided in the host 2 as the first preceding response.

Thereafter, the command processing unit 22 obtains the write data associated with the received write command from a write buffer in the memory 102 of the host 2. For example, the command processing unit 22 transmits a memory read request to the host 2. As a result, the command processing unit 22 can obtain the write data from the write buffer in the memory 102 of the host 2 via the processor 101 of the host 2. Then, the command processing unit 22 writes the obtained write data to the NAND flash memory 5 based on the allocated physical address. In this case, the write data is written to the write destination location that is in the processing target resource and indicated by the allocated physical address.

In response to the completion of the writing of the write data to the NAND flash memory 5, the command processing unit 22 transmits a command completion response indicating the completion of the write command to the host 2. In this case, the command completion response is stored in one entry in the completion queue (CQ).

As described above, in a case where the write command (nameless write command) is used as the first type command, the physical address (flash address) allocated to the write command and the data identifier of the write data are transferred to the buffer region in the memory 102 of the host 2 as information regarding the processing of the write command. That is, the physical address (flash address) allocated to the write command and the data identifier of the write data are transferred to the buffer region in the memory 102 of the host 2 as the first preceding response for the write command. Therefore, the second type command for enabling the preceding response corresponding to the write command to be transmitted to the host 2 by the controller 4 is referred to as a flash address read command (FAR command).

Note that the first type command may be a maintenance command that causes the controller 4 to execute a maintenance operation on the NAND flash memory 5. The maintenance operation may be a garbage collection operation to be executed on the NAND flash memory 5.

Next, a configuration of the NAND flash memory 5 will be described. FIG. 4 is a block diagram illustrating a relationship between the NAND interface and the plurality of NAND flash memory dies provided in the storage device according to the embodiment.

The NAND flash memory 5 includes the plurality of NAND flash memory dies. Each NAND flash memory die is independently operable.

FIG. 4 illustrates a case where 16 channels Ch.1 to Ch.16 are connected to the NAND interface 13, and two NAND flash memory dies are connected to each of the 16 channels Ch.1 to Ch.16. In this case, the 16 NAND flash memory dies #1 to #16 connected to the channels Ch.1 to Ch.16 may be organized as a bank #0, and the remaining 16 NAND flash memory dies #17 to #32 connected to the channels Ch.1 to Ch.16 may be organized as a bank #1. Each of the banks is a unit for operating a plurality of NAND flash memory dies in parallel by bank interleaving. In the configuration example of FIG. 4, up to 32 NAND flash memory dies can be operated in parallel by 16 channels and bank interleaving using the 2 banks.

The erase operation may be performed in units of one block (physical block) or may be performed in units of a block group (superblock) including a plurality of blocks. One superblock may include, but is not limited to, a total of 32 physical blocks selected one by one from the NAND flash memory dies #1 to #32. Note that each of the NAND flash memory dies #1 to #32 may have a multi-plane configuration. For example, when each of the NAND flash memory dies #1 to #32 has a multi-plane configuration including two planes, one superblock may include a total of 64 physical blocks selected one by one from 64 planes corresponding to the NAND flash memory dies #1 to #32.

FIG. 5 illustrates one superblock SB including 32 physical blocks (here, the physical block BLK2 in the NAND flash memory die #1, the physical block BLK3 in the NAND flash memory die #2, the physical block BLK7 in the NAND flash memory die #3, the physical block BLK4 in the NAND flash memory die #4, the physical blocks BLK6 in the NAND flash memory die #5, . . . , and the physical block BLK3 in the NAND flash memory die #32).

Next, a procedure of the multiphase completion response process will be described. FIG. 6 is a diagram illustrating an operation of maintaining one or more second type commands transmitted in advance from the host 2 in a pool, an operation of transmitting a completion response for one of the second type commands in the pool to the host 2 as a preceding response for a first type command transmitted from the host 2, and an operation of transmitting a completion response indicating the completion of the first type command to the host 2 in response to the completion of the first type command, which are executed in the storage device 3 according to the embodiment.

First, the host 2 issues one or more second type commands to the storage device 3 in advance via the submission queue (SQ) (step S11). FIG. 6 illustrates a case where three second type commands are issued in advance. In a case where a plurality of second type commands are issued to the storage device 3 in advance, even when a plurality of first type commands are simultaneously issued to the storage device 3 by the host 2, the storage device 3 can return a preceding response for each of the plurality of first type commands to the host 2. When it is guaranteed that the number of first type commands that the host 2 simultaneously issues to the storage device 3 is one, the host 2 may issue only one second type command to the storage device 3 in advance.

Each of the one or more second type commands issued in advance by the host 2 includes a parameter specifying a processing target memory resource among the plurality of memory resources included in the NAND flash memory 5 of the storage device 3 and a parameter specifying a process identifier indicating a process associated with the second type command. In a case where writing to a certain memory resource is started, a process identifier indicating a process that has requested the start of the writing to the memory resource can be used as the process associated with the second type command.

Upon receiving one or more second type commands, the storage device 3 stores each of the received second type commands in a pool. The storage device 3 manages a pool for each memory resource included in the NAND flash memory 5. The storage device 3 determines a pool in which each of the received second type commands is to be stored, based on a parameter specifying a processing target memory resource and included in each of the received second type commands. The storage device 3 maintains each of the received second type commands in the determined pool without completing each of the received second type commands.

Thereafter, the host 2 issues a first type command to the storage device 3 via the submission queue (SQ) (step S12). Similarly to the second type command, the first type command includes a parameter specifying a processing target memory resource among the plurality of memory resources included in the NAND flash memory 5 and a parameter specifying a process identifier indicating a process requesting processing. The process is among a plurality of processes executed by the host 2.

In response to receiving the first type command, the storage device 3 obtains, from a pool, a second type command that specifies the same memory resource identifier and process identifier as the memory resource identifier and the process identifier that are specified by the received first type command. In this case, the storage device 3 first selects the pool corresponding to the processing target memory resource indicated by the memory resource identifier specified by the first type command. Then, the storage device 3 obtains, from the selected pool, the second type command specifying the same process identifier as the process identifier specified by the received first type command.

When a plurality of second type commands specifying the same process identifier as the process identifier specified by the received first type command are present in the selected pool, the storage device 3 obtains a second type command received most recently from the host 2 among the plurality of second type commands (last-in first-out). Alternatively, the storage device 3 may obtain a second type command first received from the host 2 among the plurality of second type commands (first-in first-out).

Next, the storage device 3 completes the obtained second type command and transmits a completion response for the obtained second type command to the host 2 as a preceding response for the first type command received in step S12 (step S13). In step S13, the storage device 3 may store, to one completion queue entry, the command completion response for the second type command. The command completion response for the second type command may include information indicating the preceding response for the first type command received in step S12. Alternatively, in a case where a type of read command is used as the second type command, the storage device 3 executes an operation of transmitting a command completion response for the second type command to the host 2 and an operation of transferring, as the preceding response for the first type command, information regarding the processing of the first type command to a buffer region included in the memory 102 and associated with the second type command. The command completion response for the second type command is stored in the completion queue (CQ).

Upon receiving the command completion response for the second type command transmitted from the storage device 3 in step S13, the host 2 issues an additional second type command to the storage device 3 in advance via the submission queue (SQ) before issuing the next first type command to the storage device 3 (step S14). The additional second type command includes the same memory resource identifier and process identifier as the memory resource identifier and the process identifier that are specified by the first type command issued to the storage device 3 in step S12. Since the one second type command is completed in order to transmit the preceding response to the host 2, the number of incomplete second type commands is reduced by one. By issuing the additional second type command, the number of incomplete second type commands may be returned to the number of incomplete second type commands before the transmission of the preceding response.

Upon completing the processing of the first type command, the storage device 3 transmits a command completion response for the first type command to the host 2 (step S15). The command completion response for the first type command transmitted in step S15 includes a status or the like indicating whether the processing of the first type command has been successfully completed. The command completion response for the first type command is stored in the completion queue (CQ).

With the above operation, the storage device 3 can transmit, to the host 2, two responses including a preceding response and a command completion response for one first type command. In addition, in a case where the second type command includes a pointer indicating a buffer region that is included in the memory 102 and to which information is to be transferred, it is possible to increase the amount of information that can be notified to the host 2 as the first preceding response.

In addition, since the storage device 3 holds one or more second type commands in advance, the storage device 3 can transmit the preceding response to the host 2 more quickly as compared with a case where the storage device 3 receives the second type command after receiving the first type command.

Here, a case where a plurality of second type commands are issued by the host 2 in advance has been described, but the host 2 may issue one second type command immediately before issuing the first type command.

Figure 7:
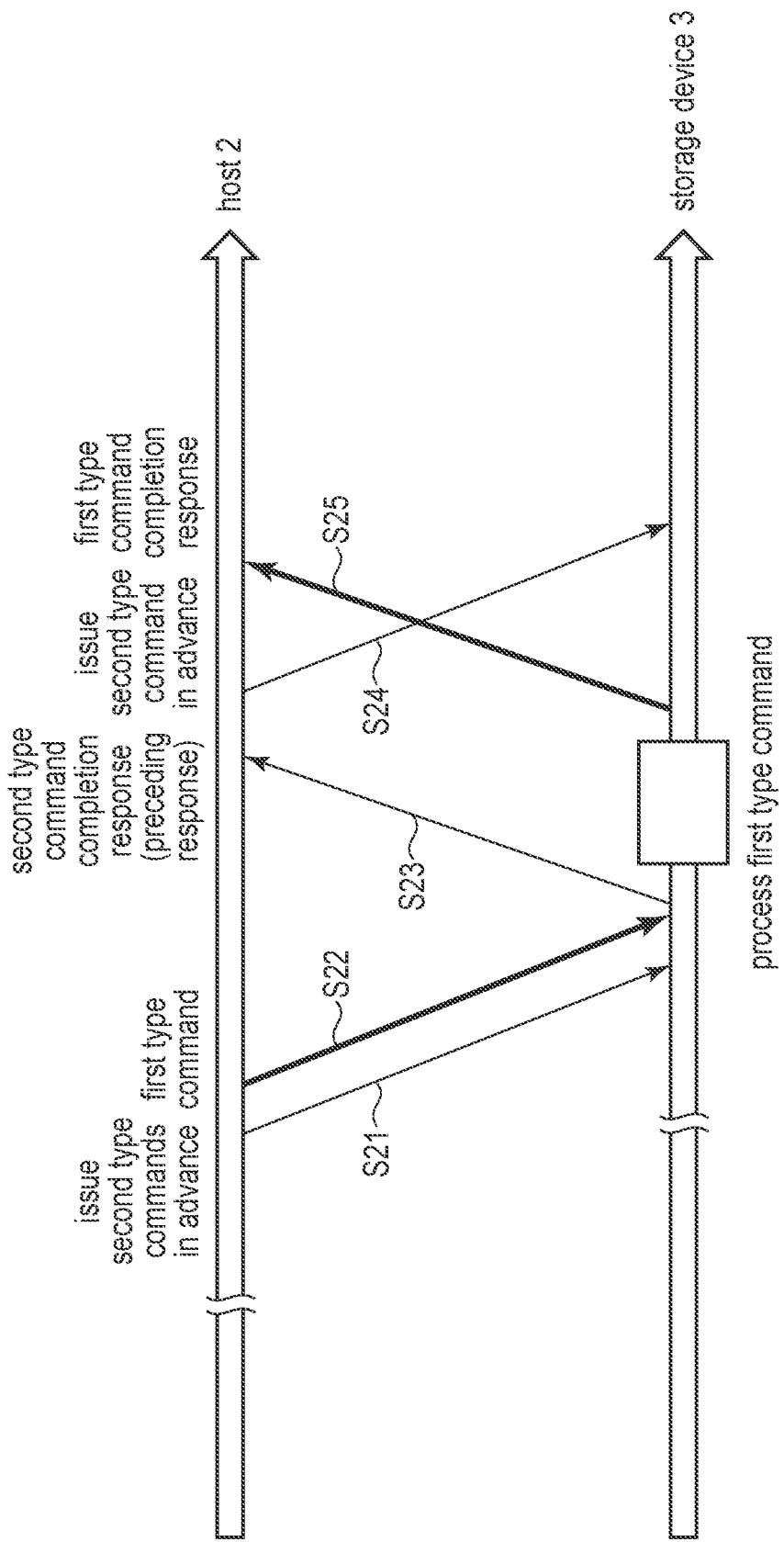
FIG. 7 is a diagram illustrating an operation of maintaining one second type command transmitted in advance from the host in a pool, an operation of transmitting a completion response for the second type command in the pool to the host as a preceding response to a first type command transmitted from the host, and an operation of transmitting a completion response indicating the completion of the first type command to the host in response to the completion of the first type command, which are executed in the storage device according to the embodiment.

Next, a procedure of the multiphase completion response process in a case where the host 2 issues one second type command immediately before issuing the first type command will be described. FIG. 7 is a diagram illustrating an operation of maintaining one second type command transmitted in advance from the host in a pool, an operation of transmitting a completion response for the second type command in the pool to the host as a preceding response for a first type command transmitted from the host, and an operation of transmitting a completion response indicating the completion of the first type command to the host in response to the completion of the first type command, which are executed in the storage device according to the embodiment.

First, the host 2 issues one second type command to the storage device 3 in advance via the submission queue (SQ) (step S21). The second type command includes a parameter specifying a processing target memory resource among the plurality of memory resources included in the storage device 3 and a parameter specifying a process identifier indicating a process associated with the second type command. In a case where writing to a certain memory resource is started, a process identifier indicating a process that has requested the start of the writing to the memory resource can be used as the process associated with the second type command. In the multiphase completion response process illustrated in FIG. 7, the host 2 issues the second type command to the storage device 3 immediately before issuing the first type command to the storage device 3. Therefore, this second type command includes the same resource identifier and process identifier as the resource identifier and the process identifier that are specified by the corresponding first type command.

Upon receiving the second type command, the storage device 3 stores the received second type command in the pool. The storage device 3 manages a pool for each memory resource included in the NAND flash memory 5. The storage device 3 determines a pool in which the received second type command is to be stored, based on the parameter specifying the processing target memory resource and included in the received second type command. The storage device 3 maintains the received second type command in the determined pool without completing the received second type command.

Thereafter, the host 2 issues the first type command to the storage device 3 via the submission queue (SQ) (step S22). Similarly to the second type command, the first type command includes a parameter specifying a processing target memory resource among the plurality of memory resources included in the NAND flash memory 5 and a parameter specifying a process identifier indicating a process requesting processing among a plurality of processes executed by the host 2.

In response to receiving the first type command, the storage device 3 obtains, from a pool, a second type command that specifies the same memory resource identifier and process identifier as the memory resource identifier and the process identifier that are specified by the received first type command. In this case, the storage device 3 first selects the pool corresponding to the processing target memory resource indicated by the memory resource identifier specified by the first type command. Then, the storage device 3 obtains, from the selected pool, the second type command specifying the same process identifier as the process identifier specified by the received first type command.

Here, the storage device 3 obtains the second type command by, for example, a last-in first-out method. In this case, the storage device 3 obtains the second type command that includes the same process identifier as the process identifier specified by the received first type command among second type commands maintained in the selected pool and has been received most recently from the host 2. In the multiphase completion response process illustrated in FIG. 7, the second type command issued immediately before the issuance of the received first type command includes the same process identifier as the process identifier specified by the received first type command, and is obtained as the second type command received most recently from the host 2.

Next, the storage device 3 completes the obtained second type command and transmits a command completion response for the completed second type command to the host 2 as a preceding response for the first type command received in step S22 (step S23). In step S23, the storage device 3 may store, to one completion queue entry, the command completion response for the second type command. The command completion response for the second type command may include information indicating the preceding response for the first type command received in step S22. Alternatively, in a case where a type of read command is used as the second type command, the storage device 3 may execute an operation of transmitting the command completion response for the second type command to the host 2 and an operation of transferring, as the preceding response for the first type command, information regarding the processing of the first type command to a buffer region included in the memory 102 and associated with the second type command. The command completion response for the second type command is stored in the completion queue (CQ).

Upon receiving the command completion response for the second type command transmitted from the storage device 3 in step S23, the host 2 may issue an additional second type command to the storage device 3 in advance via the submission queue (SQ) before issuing the next first type command to the storage device 3 (step S24). The additional second type command includes the same memory resource identifier and process identifier as the memory resource identifier and the process identifier that are specified by the first type command issued to the storage device 3 in step S22.

Alternatively, the host 2 may issue the next second type command to the storage device 3 via the submission queue (SQ) immediately before issuing the next first type command to the storage device 3. The next second type command includes the same resource identifier and process identifier as the resource identifier and the process identifier that are specified by the next first type command. In addition, the timing at which the processing in step S24 is executed is changed immediately before the next first type command is issued to the storage device 3. Then, immediately before issuing the next first type command to the storage device 3, the host 2 issues the next second type command corresponding to the next first type command to the storage device 3.

When the processing of the first type command is completed, the storage device 3 transmits a command completion response for the first type command to the host 2 (step S25). The command completion response for the first type command transmitted in step S25 includes a status or the like indicating whether the processing of the first type command has been successfully executed. The command completion response for the first type command is stored in the completion queue (CQ).

Next, a specific example of a command transmitted from the host 2 to the storage device 3 will be described.

FIG. 8 is a diagram illustrating an example of a configuration of a write command issued as a first type command to the storage device according to the embodiment.

The write command (nameless write command: NLW command) is a command used as a first type command. The write command may include a command ID, a QoS domain ID, a placement ID, a user address tag (UA tag), a process ID, a length, a data pointer, and the like.

The command ID is an identifier for identifying this command (this write command). The QoS domain ID is an identifier that can uniquely identify a QoS domain to which data is to be written. A write command transmitted from the host 2 in response for a write request from an application corresponding to a certain end user includes a QoS domain ID specifying a QoS domain corresponding to the end user. The placement ID is an identifier that can uniquely identify a storage region in the QoS domain to which the data is to be written. In each QoS domain, data associated with different placement IDs are written to different write destination superblocks currently allocated to this QoS domain. Therefore, the combination of the QoS domain ID and the placement ID is used as a parameter that specifies a write destination superblock to which the data is to be written. In a case where the write command (NLW command) is implemented by using an existing write command defined in the NVMe standard, a namespace identifier field and a stream identifier field that are included in the existing write command defined in the NVMe standard can be used as a field specifying a QoS domain ID and a field specifying a placement ID, respectively.

The UA tag is an identifier for identifying the write data to be written. The UA tag may be a logical address such as an LBA, a key of key value store, or a hash value of the key. The process ID is an identifier for uniquely identifying a process that has requested the writing of the write data.

The length indicates the length of the write data to be written. The length (data length) may be expressed by the number of LBAs or may be expressed in bytes.

The data pointer is storage location information indicating a storage location in a write buffer of the host 2 where the write data to be written is stored. A part of the storage region of the memory 102 provided in the host 2 is used as the write buffer of the host 2. The data pointer is also referred to as a write buffer address.

FIG. 9 is a diagram illustrating an example of a configuration of a flash address read command issued as a second type command to the storage device 3 according to the embodiment.

The flash address read command (FAR) is used to notify the host 2 of a physical address allocated to a write command (NLW command). This FAR is used as a second type command for enabling a preceding response corresponding for the write command (NLW) to be transmitted by the controller 4 to the host 2. The FAR may include a command ID, a QoS domain ID, a placement ID, a process ID, a data pointer, and a size.

The command ID is an identifier for identifying this command (this FAR). The QoS domain ID is an identifier for identifying a QoS domain associated with the FAR. The placement ID is an identifier for identifying a storage region included in the QoS domain associated with the FAR. The process ID is an identifier for identifying one process associated with the FAR.

The data pointer is a buffer address indicating a location (buffer region) in the memory 102 of the host 2 to which read data associated with a command completion response for the FAR, that is, information associated with the preceding response for the write command (NLW) is to be transferred. The size indicates the size of the buffer region.

FIG. 10 is a diagram illustrating an example of information transmitted as the preceding response to the host 2 by the storage device 3 according to the embodiment.

When the write command (NLW) is received by the controller 4, the controller 4 transmits an address recording request (ARR) illustrated in FIG. 10 to the host 2 as the preceding response for the write command (NLW). The address recording request (ARR) includes information corresponds to read data associated with the flash address read command (FAR). The address recording request (ARR) is transmitted from the storage device 3 to the host 2 when the physical address in the NAND flash memory 5 is allocated to the write command (NLW).

The preceding response, that is, the address recording request (ARR) includes a UA tag, the physical address, and identification information.

The UA tag is a UA tag included in the write command corresponding to this preceding response. The physical address is a physical address allocated to the write command corresponding to this preceding response. The physical address indicates a write destination location where data associated with the write command is to be written. The physical address is represented by a superblock identifier indicating a superblock to which the data is to be written and an offset from the head of the superblock to the write destination location.

The identification information is identification information that identifies the write command corresponding to this preceding response. The identification information is, for example, a QoS domain ID, a placement IM, a submission queue ID, a command ID of the write command, or the like.

In addition, each of the write command (NLW) and the FAR may include a superblock ID instead of the QoS domain ID and the placement ID.

FIG. 11 is a diagram illustrating another example of a configuration of the write command issued as the first type command to the storage device 3 according to the embodiment.

The write command (NLW) may include a command ID, a superblock ID, a user address tag (UA tag), a process ID, a length, a data pointer, and the like. The superblock ID is an identifier that can uniquely identify a superblock to which data is to be written.

FIG. 12 is a diagram illustrating another example of a configuration of the flash address read command issued as the second type command to the storage device 3 according to the embodiment.

This flash address read command (FAR) corresponds to the configuration of the write command (NLW) described with reference to FIG. 11. The flash address read command (FAR) includes a command ID, a superblock ID, a process ID, a data pointer, and a size. The superblock ID is an identifier for identifying a superblock associated with this FAR.

FIG. 13 is a diagram illustrating another example of a configuration of the information transmitted as the preceding response to the host 2 by the storage device 3 according to the embodiment.

An address recording request (ARR) illustrated in FIG. 13 corresponds to the configuration of the write command (NLW) described with reference to FIG. 11. The preceding response, that is, the address recording request (ARR) includes a UA tag, a physical address, and identification information. The identification information identifies the write command corresponding to the preceding response. The identification information is, for example, a superblock ID, a submission queue ID, a command ID of the write command, or the like.

FIG. 14 is a diagram illustrating art example of a configuration of a read command issued to the storage device according to the embodiment.

The read command is a command for requesting the storage device 3 to read data. The read command may include a command ID, a QoS domain ID, a physical address, a length, and a read buffer address.

The command ID is an identifier for identifying this command (this read command). The QoS domain ID is an identifier for identifying a QoS domain in which the data to be read is stored. The physical address indicates a physical storage location where the data to be read is stored. The physical address is represented by a superblock identifier and an offset. The length indicates the length of the data to be read. The read buffer address indicates a location in a read buffer of the host 2 to which the read data is to be transferred. A part of the storage region of the memory 102 provided in the host 2 is used as the read buffer of the host 2.

FIG. 15 is a diagram illustrating an example of a configuration of a QoS command create command issued to the storage device according to the embodiment.

The QoS domain create command is a command for creating a QoS domain. The QoS domain create command may include a command ID, a QoS domain ID, and a capacity.

The command ID is an identifier for identifying this command (this QoS domain create command). The QoS domain ID is an identifier of the QoS domain to be created. The capacity indicates a capacity to be reserved for the QoS domain to be created. The controller 4 secures the number of free superblocks corresponding to the capacity from the common free block pool 602, and allocates one superblock among the secured free superblocks as a write destination superblock for the QoS domain according to a write command specifying the QoS domain ID.

FIG. 16 is a diagram illustrating a relationship between an identifier of a block group (superblock) and an offset.

Here, in order to simplify the illustration, a case where a certain superblock SB #1 includes four blocks BLK #11, BLK #21, BLK #31, and BLK #41 is assumed. The identifier (superblock address) of the superblock SB #1 is SB #1. The four blocks BLK #11, BLK #21, BLK #31, and BLK #41 may be blocks selected from four different NAND flash memory dies.

Each block BLK includes a plurality of pages (here, page 0 to page n). In a case where the size (the user data storage region of each page) of each page is 16 Kbytes and the size of each sector included in each page is 4 Kbytes, each of the blocks BLK is logically divided into 4×(n+1) regions.

The controller 4 writes data in the order of the page 0 of the block BLK #11, the page 0 of the block BLK #21, the page 0 of the block BLK #31, the page 0 of the block BLK #41, the page 1 of the block BLK #11, the page 1 of the block BLK #21, the page 1 of the block BLK #31, the page 1 of the block BLK #41, . . . .

An offset +0 indicates the first 4 KB region of the page 0 of the block BLK #11, an offset +1 indicates the second 4 KB region of the page 0 of the block BLK #11, an offset +2 indicates the third 4 KB region of the page 0 of the block BLK #11, and an offset +3 indicates the fourth 4 KB region of the page 0 of the block BLK #11.

An offset +4 indicates the first 4 KB region of the page 0 of the block BLK #21, an offset +5 indicates the second 4 KB region of the page 0 of the block BLK #21, an offset +6 indicates the third 4 KB region of the page 0 of the block BLK #21, and an offset +7 indicates the fourth 4 KB region of the page 0 of the block BLK #21.

Similarly, an offset +12 indicates the first 4 KB region of the page 0 of the block BLK #41, an offset +13 indicates the second 4 KB region of the page 0 of the block BLK #41, an offset +14 indicates the third 4 KB region of the page 0 of the block BLK #41, and an offset +15 indicates the fourth 4 KB region of the page 0 of the block BLK #41.

An offset +16 indicates the first 4 KB region of the page 1 of the block BLK #11, an offset +17 indicates the second 4 KB region of the page 1 of the block BLK #11, an offset +18 indicates the third 4 KB region of the page 1 of the block BLK #11, and an offset +19 indicates the fourth 4 KB region of the page 1 of the block BLK #11.

An offset +20 indicates the first 4 KB region of the page 1 of the block BLK #21, an offset +21 indicates the second 4 KB region of the page 1 of the block BLK #21, an offset +22 indicates the third 4 KB region of the page 1 of the block BLK #21, and an offset +23 indicates the fourth 4 KB region of the page 1 of the block BLK #21.

Similarly, an offset +28 indicates the first 4 KB region of the page 1 of the block BLK #41, an offset +29 indicates the second 4 KB region of the page 1 of the block BLK #41, an offset +30 indicates the third 4 KB region of the page 1 of the block BLK #41, and an offset +31 indicates the fourth 4 KB region of the page 1 of the block BLK #41.

For example, when 4 KB data corresponding to a write command specifying a certain LBA (LBAx) is written to a location corresponding to the offset +8, the controller 4 may return the UA tag (=LBAx), the superblock address (=SB #1), the offset (=+8), and the length (=1) to the host 2 as the address recording request ARR.

FIG. 17 is a diagram illustrating a plurality of QoS domains managed in the storage device 3 according to the embodiment.

FIG. 17 illustrates a case where a QoS domain #0, a QoS domain #1, and a QoS domain #2 have already been created. In FIG. 17, the QoS domains are represented by rectangles. A vertical width of a rectangle representing a certain QoS domain represents the capacity of this QoS domain.

A user application #0 can perform read/write access to the QoS domain #0 by using a read/write command including the QoS domain ID #0 of the QoS domain #0. Similarly, a user application #1 can perform read/write access to the QoS domain #1 by using a read/write command including the QoS domain ID #1 of the QoS domain #1.

A user application #2 and a user application #3 may perform read/write access to the QoS domain #2 by using a read/write command including the QoS domain ID #2 of the Qos domain #2.

FIG. 18 is a block diagram illustrating a relationship between a plurality of QoS domains and the common flash block pool that are managed in the storage device 3 according to the embodiment.

The controller 4 can also manage an active block list (active block pool) corresponding to each placement ID in addition to the common free block pool 602.

Each superblock is roughly divided into an active block (a superblock in a closed state) that stores valid data and a free block that does not store valid data and can be used as a write destination superblock. For example, regarding the placement ID #1 in the QoS domain #0, each superblock which is an active block is managed by an active block pool 811 corresponding to the placement ID #1. On the other hand, each free block that can be allocated to the write destination superblock of each placement ID is managed by the common free block pool 602.

Upon receiving a write command specifying the QoS domain #0 and the placement ID #1 from the host 2, the controller 4 selects one superblock (free block) in the common free block pool 602 and allocates the selected superblock to the placement ID #1 of the QoS domain #0 as a write destination superblock. Further, the controller 4 determines a location (write destination location) in the write destination superblock. The write destination location in the write destination superblock is determined based on a restriction on the order in which writing is performed in the pages, a defective page, and the like. Then, the controller 4 writes data associated with the write command to the write destination location in the write destination superblock.

When the entire write destination superblock of the placement ID #1 is filled with the user data, the controller 4 moves the write destination superblock to the active block pool 811 of the placement ID #1 of the QoS domain #0. Then, the controller 4 selects one superblock (free block) in the common free block pool 602 again, and allocates the selected superblock as a new write destination superblock of the placement ID #1 of the QoS domain #0.

Upon receiving a write command specifying the QoS domain #0 and the placement ID #2 from the host 2, the controller 4 selects one superblock (free block) in the common free block pool 602 and allocates the selected superblock to the placement ID #2 of the QoS domain #0 as a write destination superblock. Further, the controller 4 determines a location (write destination location) in the write destination superblock. Then, the controller 4 writes data associated with the write command to the write destination location in the write destination superblock.

When the entire write destination superblock of the placement ID #2 is filled with the user data, the controller 4 moves the write destination superblock to an active block pool 812 of the placement ID #2 of the QoS domain #0. Then, the controller 4 selects one superblock (free block) in the common free block pool 602 again, and allocates the selected superblock as a new write destination superblock of the placement ID #2 of the QoS domain 90.

FIG. 19 is a block diagram for explaining a data write process executed by the storage device 3 and the host 2.

(1) In the host 2, the host FTL 301 is executed. The host FTL 301 manages mapping between each of UA tags such as LBAs and each of physical addresses of the NAND flash memory 5 using the LUT. In response to a write request from a certain user application, the host FTL 301 transmits a write command specifying a set of a QoS domain ID and a placement ID (alternatively, a superblock ID), a process ID, a UA tag, a data pointer, and a length to the storage device 3. The host FTL 301 may specify only the QoS domain ID and the placement ID (or the superblock ID) as the resource identifier of a processing target memory resource, and does not need to specify a write destination location in the processing target memory resource. Therefore, the host FTL 301 does not need to manage a defective block, a defective page, and the like in the storage device 3.

(2) The controller 4 of the storage device 3 selects one superblock from the common free block pool 602 shared by the plurality of QoS domains 601. The controller 4 allocates the selected superblock as a write destination superblock for a placement ID having the placement ID specified by the received write command. In the common free block pool 602, only free blocks other than a defective block may be managed. For example, a block having a minimum program/erase cycle count may be selected from the common free block pool 602. Then, the controller 4 determines the write destination superblock as a superblock to which data is to be written, and further determines a write destination location in the write destination superblock to which the data is to be written. When the write destination superblock for the placement ID has already been allocated, the controller 4 may determine the already allocated write destination superblock as the superblock to which the data is to be written, and there is no need to execute an operation of allocating one superblock from the common free block pool 602 as the write destination superblock for the placement ID.

(3) The controller 4 transmits a preceding response including a UA tag of the write data, a block address indicating the determined write destination superblock, and an offset indicating the determined write destination location, to the host 2, and notifies the host 2 of a physical address to which the write data associated with this write command is to be written.

(4) The controller 4 obtains the write data from the write buffer 404 of the host 2 based on a write buffer address included in the write command. The write data may be obtained from the write buffer 404 using the DMA controller 15. Then, the controller 4 executes a data write operation of writing the write data to the write destination location in the write destination superblock.

(5) After the writing of the write data is finished and the write data becomes readable from the NAND flash memory 5, the controller 4 sends a command completion response for the write command to the host 2 as a release request for releasing a region in the write buffer 404 in which the write data is stored. In response to the command completion response, the host 2 releases the region in the write buffer 404 in which the write data is stored. The released region in the write buffer 404 can be used for storing other write data and the like.

Next, a specific example of the multiphase completion response process described with reference to FIG. 6 will be described. A case where a write command is used as the first type command and a flash address read command (FAR) is used as the second type command will be assumed below. FIG. 20 is a diagram illustrating an operation of maintaining one or more flash address read commands (FAR) transmitted in advance from the host 2 in an FAR pool, an operation of transmitting a completion response for one of the FARs in the FAR pool to the host 2 as a preceding response for a write command transmitted from the host 2, and an operation of transmitting a completion response indicating the completion of the write command to the host 2 in response to the completion of the write command, which are executed in the storage device 3 according to the embodiment.

First, the host 2 issues one or more FARs to the storage device 3 in advance via the submission queue (SQ) (step S31). The FAR includes a command ID, a process ID, a data pointer, and a size. In addition, the FAR includes either a set of a QoS domain ID and a placement ID or a superblock ID as a resource identifier. A case where the FAR includes the superblock ID as the resource identifier will be described below.

Upon receiving one or more FARs, the storage device 3 stores each of the received FARs in a pool. The storage device 3 manages an FAR pool for each superblock (write destination superblock) included in the NAND flash memory 5. The storage device 3 determines an FAR pool in which each of the received FARs is to be stored, based on a parameter specifying a superblock ID and included in each of the received FARs. The storage device 3 maintains each of the received FARs in the determined FAR pool without completing each of the received FARs.

Thereafter, the host 2 transmits a write command (NLW) to the storage device 3 (step S32). The write command (NLW) includes a command ID, a UA tag, a process ID, a length, and a data pointer. In addition, the write command (NLW) includes either a set of a QoS domain ID and a placement ID or a superblock ID as a resource identifier. A case where the write command (NLW) includes the superblock ID as the resource identifier will be described below.

In response to receiving the write command (NLW), the storage device 3 allocates, to the received write command (NLW), a physical address indicating a physical storage location (write destination location) in the NAND flash memory 5 to which data associated with the received write command (NLW) is to be written.

The storage device 3 obtains an FAR that specifies the same superblock ID and process ID as the superblock ID and the process ID that are specified by the received write command (NLW). In this case, the storage device 3 first selects a pool corresponding to the write destination superblock indicated by the superblock ID specified by the received write command (NLW). Then, the storage device 3 obtains, from the selected pool, the FAR specifying the same process ID as the process ID specified by the received write command (NLW).

Then, the storage device 3 completes the obtained FAR. The storage device 3 transmits a command completion response for the completed FAR to the host 2 as a preceding response for the received write command (NLW) (step 333). In step 333, the storage device 3 transmits the command completion response for the completed FAR to the host 2. In step S33, the storage device 3 transfers an ARR to a read buffer specified by the completed data pointer of the FAR. The APR includes a physical address allocated to the received write command (NLW), a UA tag specified by the received write command (NLW), and identification information included in the received write command (NLW).

Upon receiving the completion response for the FAR transmitted from the storage device 3 in step S33, the host 2 issues an additional FAR to the storage device 3 in advance via the submission queue (SQ) before issuing, to the storage device 3, the next write command (NLW) specifying the same superblock ID as the superblock ID specified by the write command (NLW) issued in S32 (step S34). The additional FAR includes the same superblock ID and process ID as the superblock ID and the process ID that are specified by the write command (NLW) issued to the storage device 3 in step S32.

The storage device 3 obtains the write data associated with the write command (NLW) received in step S32 from the write buffer of the host 2. The storage device 3 executes a program operation of writing the write data to the write destination location in the NAND flash memory 5, based on the physical address allocated to the received write command (NLW). When the program operation is finished, the storage device 3 transmits a command completion response for the received write command (NLW) to the host 2 (step S35). The command completion response for the write command (NLW) transmitted in step S35 includes a status and the like indicating whether or not the processing of writing the data associated with the write command (NLW) has been successfully executed. The command completion response for the write command (NLW) is stored in the completion queue (CQ).

With the above operation, the storage device 3 can transmit, to the host 2, two responses including a preceding response and a command completion response for a write command (NLW). In addition, since an FAR includes a pointer indicating a buffer region in the memory 102 to which information is to be transferred, it is possible to notify the host 2 of an ARR having a relatively large size as a preceding response for the write command (NLW).

Next, a specific example of the multiphase completion response process described with reference to FIG. 7 will be described. A case where a write command is used as the first type command and a flash address read command (FAR) is used as the second type command will be assumed below. FIG. 21 is a diagram illustrating an operation of maintaining one flash address read command (FAR) transmitted in advance from the host 2 in an FAR, pool 31, an operation of transmitting, to the host 2, a completion response for the one flash address read command in the FAR pool 31 as a preceding response for a write command transmitted from the host 2, and an operation of transmitting a completion response indicating the completion of the write command to the host 2 in response to the completion of the write command, which are executed in the storage device 3 according to the embodiment.

First, the host 2 transmits one FAR to the storage device 3 (step S41). The FAR includes a command ID, a QoS domain ID, a placement ID, a process ID, a data pointer, and a size. In addition, the FAR may include either a set of the QoS domain ID and the placement ID or a superblock ID as a resource identifier. A case where the FAR includes the superblock ID as the resource identifier will be described below. In the multiphase completion response process illustrated in FIG. 21, the host 2 issues the FAR to the storage device 3 immediately before issuing a write command (NLW) to the storage device 3. Therefore, this FAR includes the same resource identifier (superblock ID) and process ID as the resource identifier (superblock ID) and the process ID that are specified by the corresponding write command (NLW).

Upon receiving the FAR, the storage device 3 stores the received FAR in the FAR pool. The storage device 3 manages an FAR pool for each superblock (write destination superblock) included in the NAND flash memory 5. The storage device 3 determines an FAR pool in which the received FAR is to be stored, based on the superblock ID included in the received FAR. The storage device 3 maintains the received FAR in the determined FAR pool without completing the received FAR.

Thereafter, the host 2 issues the write command (NLW) to the storage device 3 via the submission queue (SQ) (step S42). The write command (NLW) includes a command ID, a UA tag, a process ID, a length, and a data pointer. In addition, the write command (NLW) includes either a set of a QoS domain ID and a placement ID or a superblock ID as a resource identifier. A case where the write command (NLW) includes the superblock ID as the resource identifier will be described below.

In response to receiving the write command (NLW), the storage device 3 allocates, to the received write command (NLW), a physical address indicating a physical storage location (write destination location) in the NAND flash memory 5 to which data associated with the received write command (NLW) is to be written.

The storage device 3 obtains an FAR that specifies the same superblock ID and process ID as the superblock ID and the process ID that are specified by the received write command (NLW). In this case, the storage device 3 first selects a pool corresponding to the write destination superblock indicated by the superblock ID specified by the received write command (NLW). Then, the storage device 3 obtains, from the selected pool, the FAR specifying the same process ID as the process ID specified by the received write command (NLW). In the multi-phase completion response processing illustrated in FIG. 21, the FAR issued immediately before the issuance of the received write command (NLW) is obtained as the FAR specifying the same superblock ID and process ID as the superblock ID and the process ID that are specified by the received write command (NLW).

Then, the storage device 3 completes the obtained FAR. The storage device 3 transmits a command completion response for the completed FAR to the host 2 as a preceding response for the received write command (NLW) (step S43). In step S43, the storage device 3 transmits the command completion response for the completed FAR to the host 2. In addition, in step S43, the storage device 3 transfers an ARR to a read buffer specified by the data pointer of the completed FAR. The ARR includes a physical address allocated to the received write command (NLW), a UA tag specified by the received write command (NLW), and identification information included in the received write command (NLW).

Upon receiving the completion response for the FAR transmitted from the storage device 3 in step S43, the host 2 may issue an additional FAR to the storage device 3 in advance via the submission queue (SQ) before issuing, to the storage device 3, the next write command (NLW) specifying the same superblock ID as the superblock ID specified by the write command (NLW) issued in S42 (step S44). The additional FAR includes the same superblock ID and process ID as the superblock ID and the process ID that are specified by the write command (NLW) issued to the storage device 3 in step S42.

Alternatively, the host 2 may issue the next FAR to the storage device 3 via the submission queue (SQ) immediately before issuing the next write command (NLW) to the storage device 3. The next FAR includes the same superblock ID and process ID as the superblock ID and the process ID that are specified by the next write command (NLW). In addition, the timing at which the processing in step S44 is executed is changed immediately before the next write command (NLW) is issued to the storage device 3. Then, immediately before the issuance of the next write command (NLW) to the storage device 3, the next FAR corresponding to the next write command (NLW) is issued to the storage device 3.

The storage device 3 obtains the write data associated with the write command (NLW) received in step S42 from the write buffer of the host 2. The storage device 3 executes a program operation of writing the write data to the write destination location in the NAND flash memory 5, based on the physical address allocated to the received write command (NLW). When the program operation is finished, the storage device 3 transmits a command completion response for the received write command (NLW) to the host 2 (step S45). The command completion response for the write command (NLW) transmitted in step S45 includes a status and the like indicating whether or not the processing of writing the data associated with the write command (NLW) has been successfully executed. The command completion response for the write command (NLW) is stored in the completion queue (CQ).

FIG. 22 is a block diagram illustrating an operation of maintaining one or more flash address read commands (FAR) specifying the same memory resource in the same FAR pool 31, an operation of transmitting a preceding response for a write command to the host using an FAR maintained in an FAR pool 31 corresponding to a memory resource specified by the write command, and an operation of transmitting a completion response for the write command to the host, which are executed in the storage device 3 according to the embodiment;

First, the host 2 stores a command to be transmitted to the storage device 3 in the submission queue (SQ). The command stored in the submission queue may be any command such as a write command, a flash address read command (FAR), or a read command.

The command fetch unit 21 of the storage device 3 fetches the command from the submission queue (SQ). Here, in a case where the fetched command is the FAR, the command fetch unit 21 identifies a write destination superblock based on a superblock ID included in the fetched FAR. The FAR pool corresponding to the identified write destination superblock is determined as an FAR pool in which the fetched FAR is to be stored.

For example, when the identified write destination superblock is the write destination superblock SB #1, the command fetch unit 21 stores the fetched FAR to an FAR pool 31-1 corresponding to the write destination superblock SB #1. When the identified write destination superblock is the write destination superblock SB #2, the command fetch unit 21 stores the fetched FAR to an FAR pool 31-2 corresponding to the write destination superblock SB #2.

In a case where the fetched command is the write command (NLW), the command fetch unit 21 transmits the write command (NLW) to the command processing unit 22. In response to the reception of the write command, the command processing unit 22 determines a physical address indicating a storage region in the NAND flash memory 5 to which data associated with the write command (NLW) is to be written. Then, the command processing unit 22 obtains a superblock ID and a process ID that are included in the write command (NLW).

For example, in a case where the write command (NLW) includes the superblock SB #2, the command processing unit 22 obtains an FAR including the same process ID as the process ID included in the write command (NLW) from the FAR pool 31-2.

The command processing unit 22 completes the obtained FAR. Then, the command processing unit 22 transmits a command completion response (FAR completion) for the completed FAR to the host 2 as a preceding response (first preceding response) for the received write command (NLW). In this case, the command processing unit 22 executes an operation of storing the command completion response (FAR completion) for the completed FAR in the completion queue (CO) and an operation of transferring an ARR corresponding to the received write command (NLW) to a location in a read buffer 701 indicated by the data pointer of the completed FAR.

The ARR corresponding to the received write command (NLW) includes a physical address allocated to the received write command (NLW), a UA tag included in the received write command (NLW), and identification information for identifying the received write command (NLW).

The host 2 processes the command completion response (FAR completion) for the completed FAR. As a result, the host 2 recognizes that the ARR for the write command (NLW) for writing the data to a memory resource (for example, a superblock) specified by the FAR is stored in the read buffer by the storage device 3 as a preceding response. Then, the host 2 processes the ARR and updates the LUT such that the physical address included in the ARR is associated with the UA tag included in the APR.

After transmitting the command completion response (FAR completion) for the completed FAR to the host 2 as the preceding response (first preceding response), the command processing unit 22 obtains the write data associated with the received write command (NLW) from the write buffer 404 of the host 2 and writes the write data in the NAND flash memory 5. Then, the command processing unit 22 transmits a command completion response for the received write command (NLW) to the host 2. The command completion response is stored in the completion queue (CQ).

Figure 23:
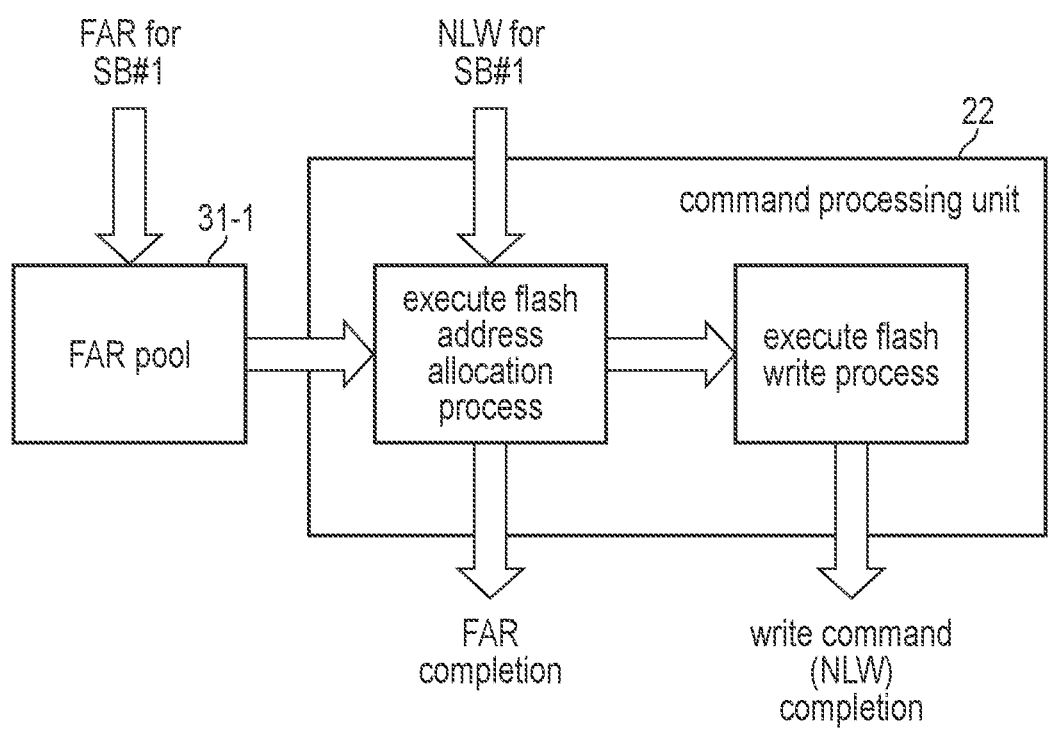
FIG. 23 is a block diagram illustrating an operation of maintaining one or more flash address read commands (FAR) specifying a certain superblock in an FAR pool corresponding to the superblock, an operation of transmitting a preceding response for a write command specifying the superblock to the host, and an operation of transmitting a completion response for the write command to the host.

FIG. 23 is a block diagram illustrating an operation of maintaining one or more flash address read commands (FAR) specifying a certain superblock in an FAR pool corresponding to the superblock, an operation of transmitting a preceding response for a write command specifying the superblock to the host 2, and an operation of transmitting a completion response for the write command to the host 2.

Upon receiving the FAR transmitted from the host 2, the controller 4 obtains the superblock ID included in the received FAR. In a case where the superblock ID included in the received FAR indicates SB #1, the controller 4 stores the FAR to the FAR pool 31-1 associated with SB #1. The FAR pool 31-1 maintains the stored FAR.

Then, upon receiving a write command (NLW) including the superblock ID indicating SB #1, the command processing unit 22 executes a flash address allocation process. In the flash address allocating process, the command processing unit 22 determines a write destination location in SB #1 to which data associated with the write command (NLW) is to be written. Then, the command processing unit 22 allocates a physical address (superblock ID, offset) indicating the determined write destination location to the write command (NEW).

In addition, the command processing unit 22 obtains the FAR from the FAR pool. 31-1. In this case, the command processing unit 22 obtains the FAR including the same process ID as the process ID included in the received write command (NLW) from the FAR pool 31-1.

The controller 4 transmits, to the host 2, the physical address allocated to the write command (NLW), a UA tag included in the write command (NLW), and identification information for identifying the write command (NLW) as read data associated with the obtained FAR. Then, the controller 4 transmits a command completion response for the FAR to the host 2. That is, the controller 4 transmits both the command completion response for the FAR and the read data (ARR) associated with the FAR, to the host 2 as a preceding response for the write command (NLW).

Then, the command processing unit 22 executes a flash write process of writing the data associated with the write command (NLW) to the NAND flash memory 5. Thereafter, the controller 4 transmits a command completion response for the write command (NLW) to the host 2.

Figure 24:
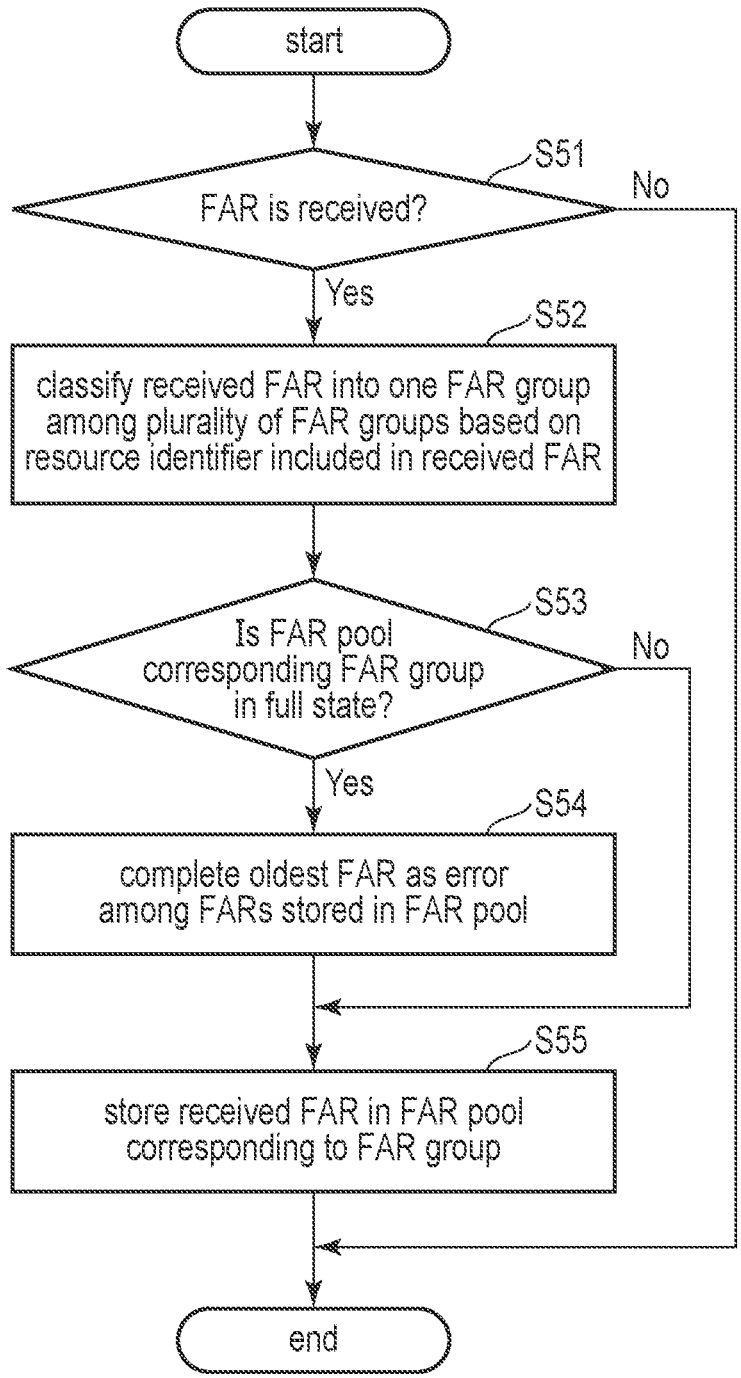
FIG. 24 is a flowchart illustrating a procedure of processing a flash address read command (FAR), which is executed in the storage device according to the embodiment.

FIG. 24 is a flowchart illustrating a procedure of a process executed on a flash address read command (FAR) in the storage device 3 according to the embodiment.

Upon receiving a command from the host 2, that is, upon fetching the command issued by the host 2 from the submission queue (SQ), the controller 4 determines whether the received command is an FAR (step S51).

When the received command is not the FAR (No in step S51), the controller 4 ends the process executed on the FAR.

When the received command is the FAR (Yes in step S51), the controller 4 classifies the received FAR into one FAR group among a plurality of FAR groups based on a resource identifier included in the received FAR (step S52). Here, the resource identifier included in the FAR may be, for example, a QoS domain ID, a set of a QoS domain ID and a placement ID, or a superblock ID. In addition, the plurality of FAR groups are associated with a plurality of memory resources (for example, a plurality of write destination superblocks or a plurality of QoS domains).

The controller 4 determines whether or not an FAR pool corresponding to the FAR group into which the FAR received in step S51 is classified is in the full state (step S53). The FAR pool is among the plurality of FAR pools corresponding to the plurality of FAR groups.

When the FAR pool corresponding to the FAR group into which the received FAR is classified is in the full state (Yes in step S53), the controller 4 completes the oldest FAR as an error among incomplete FARs that have already been maintained in the FAR pool (step S54). In step S54, the controller 4 stores, to the completion queue (CQ), a command completion response including a command ID of the oldest incomplete FAR, a submission queue ID into which the oldest incomplete FAR has been fetched, a status indicating an error, and the like.

The number of new commands fetched once from the submission queue is one or more. Therefore, N (N>1) new FARs belonging to the same FAR group may be fetched from the submission queue. In this case, the controller 4 completes, as an error, the oldest N FARs among the incomplete FARs maintained in the FAR pool.

As described above, in a case where the number of FARs to be maintained in a certain FAR pool exceeds an upper limit of the number of FARs that can be maintained in each FAR pool, the controller 4 completes, as an error, the number of FARs in excess of the upper limit among the incomplete FARs that have already been maintained in this FAR pool.

When the FAR pool 31 corresponding to the FAR group into which the received FAR is classified is not in the full state (No in step S55) or when the process of step S54 is ended, the controller 4 stores the FAR received in step S51 to the FAR pool corresponding to the FAR group into which the FAR is classified (step S55).

With this operation, the controller 4 can maintain the FAR received from the host 2 in one of the plurality of FAR pools without completing the FAR.

FIG. 25 is a flowchart illustrating a procedure of a process executed on a write command (NLW) in the storage device 3 according to the embodiment.

Upon receiving a command from the host 2, that is, upon fetching the command issued by the host 2 from the submission queue (SQ), the controller 4 determines whether the received command is a write command (NLW) (step S61).

When the received command is not the write command (NLW) (No in step S61), the controller 4 ends the process executed on the write command (NLW).

When the received command is the write command (NLW) (Yes in step S61), the controller 4 determines a write destination location in the NAND flash memory 5 where data associated with the received write command (NLW) is to be written (step S62). In step S62, the controller 4 determines the write destination location in a memory resource indicated by a resource identifier specified by the received write command (NLW). Then, the controller 4 allocates a physical address (superblock ID of the write destination superblock, offset from the head of the write destination superblock to the write destination location) indicating the determined write destination location, to the received write command (NLW).

Next, the controller 4 selects an FAR group associated with the resource identifier specified by the received write command (NLW) (step S63). The controller 4 determines whether or not an FAR including the same process identifier as the process identifier specified by the write command (NLW) is present in an FAR pool 31 corresponding to the selected FAR group (step S64).

When the FAR including the same process identifier as the process identifier specified by the received write command (NLW) is present in the FAR pool 31 corresponding to the selected FAR group (Yes in step S64), the controller 4 obtains the FAR including the same process identifier as the process identifier specified by the received write command (NLW) from the FAR pool 31 corresponding to the selected FAR group (step S65). In step S65, the controller 4 obtains, from the FAR pool 31 corresponding to the selected FAR group, the FAR that includes the same process identifier as the process identifier specified by the received write command (NLW) and has been received most recently from the host 2.

The controller 4 completes the obtained FAR and transmits a command completion response for the completed FAR to the host 2 as a preceding response for the received write command (NLW) (step S66). In step S66, the controller 4 executes an operation of transmitting the command completion response for the completed FAR to the host 2 and an operation of transferring an APR for the received write command (NLW) to a location in the read buffer of the host 2.

In the operation of transferring the ARR to the location in the read buffer of the host 2, for example, the controller 4 transmits a memory write request specifying the location in the read buffer of the host 2 to the host 2. As a result, the controller 4 stores the ARR at the location in the read buffer of the host 2 via the processor 101 of the host 2.

The controller 4 obtains the data associated with the received write command (NLW) from the write buffer of the host 2. Then, the controller 4 executes a write operation of writing the obtained data to the NAND flash memory 5 (step S67). When the write operation is finished, the controller 4 transmits a command completion response for the received write command (NLW) to the host 2 (step S68).

When the FAR including the same process identifier as the process identifier specified by the received write command (NLW) is not present in the FAR pool 31 corresponding to the selected FAR group (No in step S64), the controller 4 completes the received write command (NLW) as an error (step S69). In step S69, the controller 4 transmits, to the host 2, a command completion response for the received write command (NLW). In this case, the command completion response for the received write command (NLW) includes a status indicating an error of the received write command (NLW). As a result, the host 2 is notified that the write command (NLW) has been completed as an error.

Figure 26:
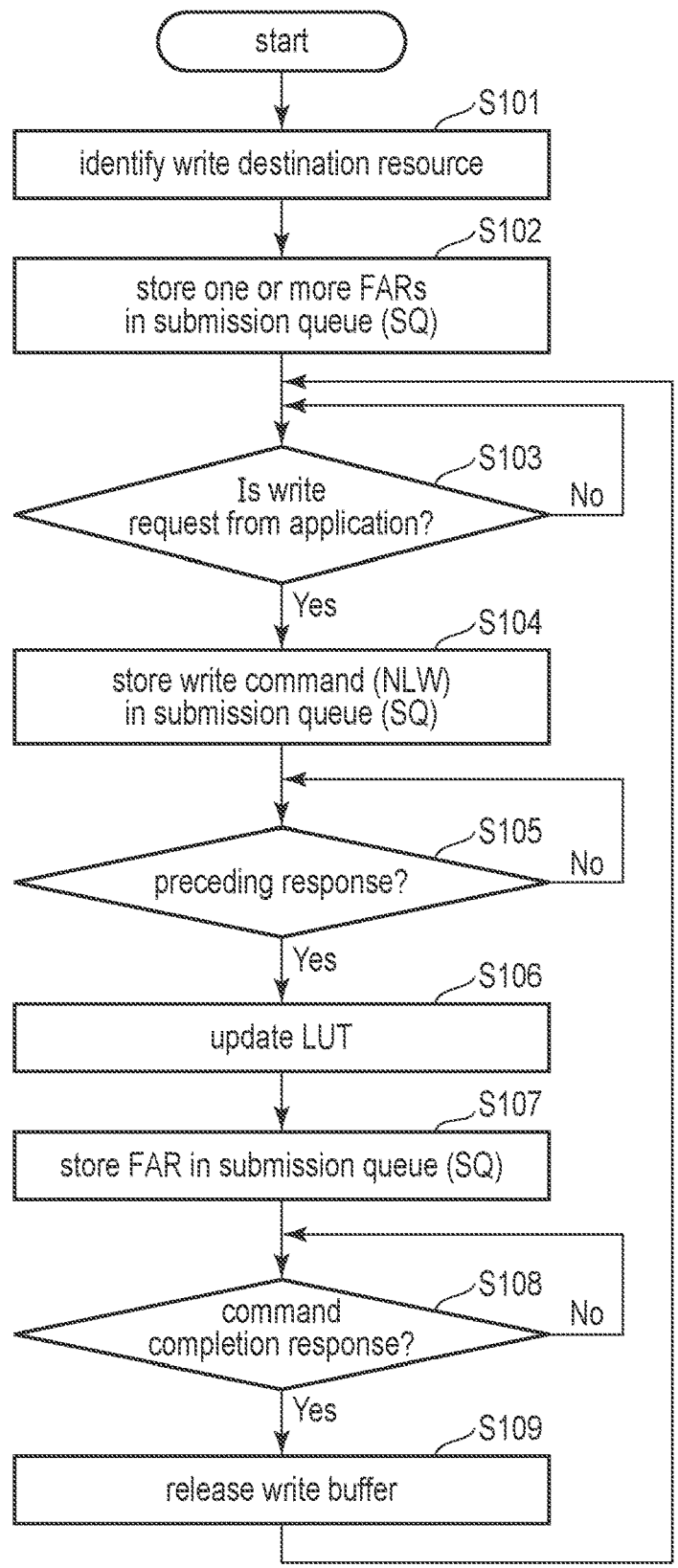
FIG. 26 is a flowchart illustrating a procedure of a process executed in the host.

FIG. 26 is a flowchart illustrating a procedure of a process executed in the host 2.

First, when writing to a certain memory resource in the NAND flash memory 5 is to be started, the host 2 identifies the memory resource as a write destination resource (write destination memory resource) (step S101). For example, when a process corresponding to a certain application is started, a memory resource which is included in the NAND flash memory 5 and is allocated to this process (application) may be determined as a memory resource for which writing is to be started, that is, as a write destination resource. The resource identifier of the write destination resource may be represented by a set of a QoS domain ID and a placement ID, or may be represented by a superblock ID. Then, the host 2 stores, in the submission queue (SQ), one or more FARs each including the resource identifier of the write destination resource and the process ID of the process to which the write destination resource is allocated (step S102). In this way, one or more FARs are issued in advance to the storage device 3 via the submission queue (SQ).

The host 2 waits until a write request (including a UA tag, a length, and a data pointer) is issued from this process (application) (step S103).

When the write request from the application is not issued (No in step S103), the host 2 waits until the write request from the application is issued. When the write request is issued from this process (application) (Yes in step S103), the host 2 stores a write command (NLW) in the submission queue (SQ) based on the write request (step 3104). The write command (NLW, includes the resource identifier of the write destination resource, the process ID for identifying the process that has issued the write request, the UA tag included in the write request, the length included in the write request, the data pointer included in the write request, and the like. In this way, the host 2 generates the write command (NLW) by adding the resource identifier and the process ID to the write request from this process (application). Then, the host 2 issues the generated write command (NLW) to the storage device 3 via the submission queue (SQ).

Upon receiving the write command (NLW) issued from the host 2, the storage device 3 selects one FAR specifying the same resource identifier and process ID as the resource identifier and the process ID) that are specified by the write command (NLW), and completes the selected one FAR. Then, the storage device 3 transmits a command completion response for the completed FAR to the host 2 as a preceding response for the received write command (NLW). In this case, the storage device 3 executes an operation of storing the command completion response for the completed FAR in the completion queue (CQ) and an operation of transferring an ARR associated with the received write command (NLW) to a location in the read buffer specified by the completed FAR.

The host 2 determines whether or not the host 2 has received the command completion response (preceding response) for the FAR from the storage device 3 (step S105). When the host 2 has not received the command completion response (preceding response) for the FAR from the storage device 3 (No in step S105), the host 2 waits until the host 2 receives the command completion response (preceding response) for the FAR from the storage device 3. When the host 2 has received the command completion response for the FAR, more specifically, when the command completion response for the received FAR includes a status indicating the success of the FAR (Yes in step S105), the host 2 obtains the ARR from the read buffer specified by the data pointer in the completed FAR, and updates the LUT such that a physical address indicated by the obtained ARR is associated with a UA tag indicated by the obtained ARR (step S106).

The host 2 stores an additional FAR in the submission queue (SQ) (step S107). The additional FAR includes the resource identifier of the write destination resource identified in step S101 and the process ID of the process to which the write destination resource is allocated. As a result, the host. 2 replenishes one FAR specifying the write destination resource specified in step S101.

The host 2 determines whether or not the host 2 has received a command completion response for the write command (NLW) issued in step 3104 (step S108).

When the host 2 has not received the command completion response for the write command (NLW) (No in step S108), the host 2 waits until the host 2 receives the command completion response for the write command (NLW).

When the host 2 has received the command completion response for the write command (NLW) (Yes in step S108), the host 2 releases a region in the write buffer in which write data associated with the write command (NLW) is stored (step S109).

As described above, according to the present embodiment, in response to receiving, from the host 2, one or more second type commands for enabling one of one or more preceding responses to be transmitted to the host 2 by the storage device 3, the controller 4 maintains the received one or more second type commands in an FAR pool, which is a memory region in the storage device 3, without completing processing of the received one or more second type commands. In response to receiving a first type command from the host 2, the controller 4 obtains one second type command among the one or more second type commands from the memory region, completes processing of the obtained one second type command, and transmits a command completion response for the one second type command to the host 2 as a first preceding response for the received first type command. Then, the controller 4 transmits a command completion response for the first type command to the host 2 in response to the completion of the processing of the first type command.

Therefore, even in a case where communication with the host 2 is performed according to the logical interface standard in which only one response is returned for one command, two or more responses including one or more preceding responses and a command completion response can be returned for the first type command.

In addition, each of the one or more second type commands includes a pointer indicating a buffer region that is included in the memory 102 provided in the host 2 and to which information is to be transferred. The controller 4 executes an operation of transmitting a command completion response for one second type command to the host 2 and an operation of transferring a first preceding response for the first type command to a buffer region which is included in the memory 102 and is specified by a pointer included in the second type command. In this manner, by transferring the first preceding response to the buffer region of the memory 102, it is possible to increase the amount of information that can be notified to the host 2 as the first preceding response.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A storage device being capable of communicating with a host in accordance with a predetermined interface standard in which one completion response for one command issued from the host is allowed to be transmitted by the storage device to the host, the storage device comprising:
   a nonvolatile memory; and
   a controller configured to transmit, to the host, one or more preceding responses for a first type command requesting the storage device to execute a first operation and a command completion response indicating that processing of the first type command is completed, wherein
   the one or more preceding responses include at least a first preceding response indicating that the first type command has been received, and each of the one or more preceding responses is a response transmitted to the host by the storage device before the transmission of the command completion response, and
   the controller is configured to:
   in response to receiving, from the host, one or more second type commands for enabling a preceding response to be transmitted by the storage device to the host, maintain the received one or more second type commands in a memory region in the storage device without completing processing of the received one or more second type commands;
   in response to receiving the first type command from the host, obtain a second type command among the one or more second type commands from the memory region, complete processing of the obtained second type command, and transmit a command completion response for the second type command to the host as the first preceding response for the first type command; and in response to completion of processing of the first type command, transmit the command completion response for the first type command to the host.

2. The storage device according to claim 1, wherein,
each of the one or more second type commands includes a pointer indicating a buffer region that is included in a memory provided in the host and to which information is to be transferred, and
the controller is configured to execute an operation of transmitting the command completion response for the second type command to the host, and an operation of transferring, as the first preceding response, information relating to the processing of the first type command to the buffer region in the memory provided in the host.

3. The storage device according to claim 1, wherein
the first type command includes a parameter specifying a processing target memory resource among a plurality of memory resources included in the nonvolatile memory, and a parameter specifying a process identifier indicating a process requesting execution of processing corresponding to the first type command among a plurality of processes executed by the host, and
the controller is configured to:
manage a plurality of memory regions corresponding to the plurality of memory resources;
receive, from the host, a plurality of second type commands, each of the second type commands including a parameter specifying a memory resource among the memory resources and a parameter specifying a process identifier indicating a process among the processes;
maintain each of the received second type commands in a memory region among the plurality of memory regions based on a memory resource specified by each of the received second type commands such that each of second type commands specifying a same memory resource is maintained in a same memory region; and
in response to receiving the first type command from the host,
select, from the plurality of memory regions, a memory region corresponding to the processing target memory resource specified by the received first type command;
obtain a second type command specifying the same process identifier as the process identifier specified by the received first type command among the second type commands maintained in the selected memory region; and
complete processing of the obtained second type command, and transmit a command completion response for the second type command to the host as the first preceding response for the received first type command.

4. The storage device according to claim 3, wherein
the controller is configured to:
complete the received first type command as an error when the one or more second type commands maintained in the selected first memory region do not include a second type command specifying the same process identifier as the process identifier specified by the received first type command.

5. The storage device according to claim 3, wherein
the controller is configured to:
manage whether each of the memory resources is in an available state or an unavailable state; and
when a plurality of first type commands specifying a first memory resource among the plurality of memory resources are received and processed by the controller and then the first memory resource transitions from an available state to an unavailable state, complete, as an error, each of incomplete second type commands maintained in a memory region among the plurality memory regions, the memory region corresponding to the first memory resource.

6. The storage device according to claim 3, wherein
the nonvolatile memory includes a plurality of blocks each of which is a unit for data erase operation, and
the controller is configured to manage a plurality of block groups each including one or more blocks, and
each of the plurality of memory resources is a block group among the block groups.

7. The storage device according to claim 3, wherein
the first type command is a write command for writing data to the nonvolatile memory, and
the write command includes a parameter specifying a memory resource among the plurality of memory resources as a processing target memory resource to which the data is to be written, and a parameter specifying a data identifier for identifying the data.

8. The storage device according to claim 7, wherein
each of the one or more second type commands includes a pointer indicating a buffer region that is in a memory provided in the host and to which information is to be transferred, and
the controller is configured to:
in response to receiving the write command from the host,
allocate, to the write command, a physical address indicating a physical storage location in the processing target memory resource to which data associated with the write command is to be written;
complete processing of the obtained second type command; and
execute an operation of transmitting the command completion response for the second type command to the host and an operation of transferring, as the first preceding response, the allocated physical address and the data identifier to the buffer region in the memory provided in the host.

9. The storage device according to claim 5, wherein
the nonvolatile memory includes a plurality of blocks each of which is a unit for data erasing operation, and
the controller is configured to manage a plurality of block groups each including one or more blocks,
each of the memory resources is a block group among the block groups,
the available state of each of the memory resources indicates a state in which new data is capable of being written to a block group corresponding to the memory resource, and
the unavailable state of each of the memory resources indicates a state in which an entire block group corresponding to the memory is filled with data.

10. The storage device according to claim 1, wherein
each of the one or more preceding responses includes identification information included in the first type command.

11. The storage device according to claim 10, wherein
the first type command includes a resource identifier for identifying a processing target memory resource among a plurality of memory resources included in the nonvolatile memory, and
the identification information included in each of the one or more preceding responses includes the resource identifier included in the first type command.

12. The storage device according to claim 10, wherein
the identification information included in each of the one or more preceding responses includes at least one of an identifier for identifying a submission queue from which the first type command is fetched, a command identifier for identifying the first type command, and any numerical value given to the first type command by the host.

13. The storage device according to claim 3, wherein
the controller is configured to:
obtain, from among the second type commands maintained in the selected first memory region, a second type command that includes the same process identifier as the process identifier included in the received first type command and is received most recently from the host; and
complete processing of the obtained second type command, and transmit a command completion response for the second type command to the host as the first preceding response for the received first type command.

14. The storage device according to claim 3, wherein
the controller is configured to complete, as an error, when the number of second type commands to be maintained in a memory region among the plurality of memory regions exceeds an upper limit of the number of commands that can be maintained in each of the memory regions, the number of second type commands in excess of the upper limit among incomplete second type commands already maintained in the memory region.

15. The storage device according to claim 14, wherein
the controller is configured to complete, as an error, one or more second type commands which are oldest among incomplete second type commands already maintained in the memory region.

16. The storage device according to claim 1, wherein
the logical interface standard is a standard of NVM express, and
the controller is configured to perform communication with the host in accordance with the standard of NVM express.

17. A storage system comprising a host and a storage device, wherein
communication between the host and the storage device is performed in accordance with a predetermined interface standard in which one completion response for one command issued from the host is allowed to be transmitted by the storage device to the host,
the storage device comprises:
a nonvolatile memory; and
a controller configured to transmit, to the host, one or more preceding responses for a write command for writing data to the nonvolatile memory and a command completion response indicating that processing of the write command is completed,
the write command includes a parameter specifying a data identifier for identifying the data, the one or more preceding responses include at least a first preceding response indicating that the write command has been received, and each of the one or more preceding responses is a response transmitted to the host by the storage device before the transmission of the command completion response,
the host is configured to:
issue, to the storage device, one or more second type commands for enabling a preceding response among the one or more preceding responses to be transmitted by the storage device to the host, each of the one or more second type commands including a pointer indicating a buffer region that is included in a memory provided in the host and to which information is to be transferred; and
issue the write command to the storage device after issuing the one or more second type commands to the storage device,
the controller is configured to:
in response to receiving the one or more second type commands from the host, store the one or more second type commands to a memory region in the storage device;
in response to receiving the write command from the host, allocate to the write command, a physical address indicating a physical storage location in the nonvolatile memory to which data associated with the write command is to be written;
obtain a second type command among the one or more second type commands from the memory region;
complete processing of the obtained second type command; and
execute an operation of transmitting the command completion response for the second type command to the host and an operation of transferring the allocated physical address and the data identifier as the first preceding response to the buffer region in the memory provided in the host,
obtain the data associated with the write command from the memory of the host, and write the obtained data to the nonvolatile memory based on the allocated physical address; and
in response to completion of the writing of the data to the nonvolatile memory, transmit the command completion response indicating the completion of the write command to the host.

18. The storage system according to claim 12, wherein
the write command includes a parameter specifying a processing target memory resource to which the data associated with the write command is to be written among a plurality of memory resources included in the nonvolatile memory, and a parameter specifying a process identifier indicating a process requesting processing for the processing target memory resource among a plurality of processes executed by the host, and
the controller is configured to:
manage a plurality of memory regions corresponding to the plurality of memory resources;
receive, from the host, a plurality of second type commands, each of the second type commands including a parameter specifying a memory resource among the plurality of memory resources and a parameter specifying a process identifier indicating a process among the plurality of processes;
maintain each of the received second type commands in a memory region among the plurality of memory regions based on a memory resource specified by each of the received second type commands such that each of second type commands specifying a same memory resource is maintained in a same memory region; and
in response to receiving the write command from the host, select a memory region corresponding to the processing target memory resource specified by the received write command from the memory regions;

obtain a second type command specifying the same process identifier as the process identifier specified by the received write command among the second type commands maintained in the selected memory region;

complete processing of the obtained second type command; and execute an operation of transmitting the command completion response for the second type command to the host and an operation of transferring the allocated physical address and the data identifier as the first preceding response to the buffer region in the memory provided in the host, and the host is configured to:

issue, to the storage device, a new second type command including a parameter specifying the processing target memory resource and a parameter specifying a process identifier indicating a process among the plurality of processes after issuing the write command to the storage device.

19. The storage system according to claim 17, wherein the host is configured to:

manage mapping between each of data identifiers and each of physical address of the nonvolatile memory using an address translation table; and update the address translation table such that the physical address transmitted from the storage device is associated with the data identifier transmitted from the storage device.

* * * * *